US012202500B2

(12) United States Patent
Gupta et al.

(10) Patent No.: US 12,202,500 B2
(45) Date of Patent: Jan. 21, 2025

(54) METHOD AND APPARATUS FOR RELATIVE POSITIONING OF A USER EQUIPMENT IN A VEHICLE

(71) Applicant: QUALCOMM Incorporated, San Diego, CA (US)

(72) Inventors: Santosh Kumar Gupta, San Jose, CA (US); Shishir Gupta, San Jose, CA (US); Constantinos Steven Bekis, Aliso Viejo, CA (US); Liang Zhao, Saratoga, CA (US); Le Nguyen Luong, San Diego, CA (US); Cheng-Han Wang, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 456 days.

(21) Appl. No.: 17/491,506

(22) Filed: Sep. 30, 2021

(65) Prior Publication Data
US 2023/0099551 A1    Mar. 30, 2023

(51) Int. Cl.
*H04M 11/00*    (2006.01)
*B60W 50/12*    (2012.01)
(Continued)

(52) U.S. Cl.
CPC ...... *B60W 50/12* (2013.01); *H04M 1/724631* (2022.02); *H04W 4/48* (2018.02);
(Continued)

(58) Field of Classification Search
CPC ............. B60W 50/12; B60W 2540/01; B60W 2540/227; B60W 2540/26;
(Continued)

(56) References Cited

U.S. PATENT DOCUMENTS

| 8,994,492 B2 | 3/2015 | Farhan et al. |
| 9,280,145 B2 | 3/2016 | Hannon |

(Continued)

FOREIGN PATENT DOCUMENTS

| CN | 113415250 | 9/2021 |
| KR | 20210079181 | 6/2021 |

OTHER PUBLICATIONS

International Search Report and Written Opinion—PCT/US2022/075184—ISA/EPO—Feb. 3, 2023.
(Continued)

*Primary Examiner* — Masud Ahmed
(74) *Attorney, Agent, or Firm* — Weaver Austin Villeneuve & Sampson LLP/QUALCOMM

(57) ABSTRACT

The relative position of a user equipment (UE) within a vehicle is determined using angular measurements, such as angle of arrival (AOA), and optionally ranging measurements, with respect to a number of wireless transceivers within the vehicle using wideband signals. The relative position of the UE with respect to a personal zone or the steering wheel may be determined based on known positions of the wireless transceivers. If the UE is determined to be within the personal zone, at least one functionality of the UE is restricted to avoid driver distraction and, optionally, the operation autonomous driving of the vehicle adjusted. If the UE is worn on the driver's wrist the relative position of the UE with respect to the steering wheel may be similarly determined and operation of the vehicle modified if the UE is determined to be outside a threshold distance from the steering wheel.

32 Claims, 10 Drawing Sheets

(51) Int. Cl.
*H04M 1/72463* (2021.01)
*H04W 4/48* (2018.01)
*H04W 64/00* (2009.01)

(52) U.S. Cl.
CPC ...... *H04W 64/003* (2013.01); *B60W 2540/01* (2020.02); *B60W 2540/227* (2020.02); *B60W 2540/26* (2013.01)

(58) Field of Classification Search
CPC ............. H04M 1/724631; H04W 4/48; H04W 64/003; H04W 4/021; H04W 4/026; H04W 4/023; G06V 20/56
See application file for complete search history.

(56) References Cited

U.S. PATENT DOCUMENTS

| | | | |
|---|---|---|---|
| 9,332,126 B2 | 5/2016 | Tadayon et al. | |
| 10,284,709 B2* | 5/2019 | Miller | .................. H04W 24/10 |
| 10,382,617 B2 | 8/2019 | Atkinson et al. | |
| 10,547,736 B2 | 1/2020 | Hannon et al. | |
| 2011/0195699 A1* | 8/2011 | Tadayon | .................. H04B 5/77 |
| | | | 455/418 |
| 2015/0149042 A1 | 5/2015 | Cooper et al. | |
| 2015/0256668 A1* | 9/2015 | Atkinson | ................ H04W 4/48 |
| | | | 455/418 |
| 2015/0256669 A1* | 9/2015 | James | .................. H04W 48/04 |
| | | | 455/418 |
| 2017/0075740 A1* | 3/2017 | Breaux | ................. H04W 48/04 |
| 2018/0288232 A1* | 10/2018 | Macneille | ............ H04W 4/026 |
| 2018/0288672 A1* | 10/2018 | Sai | .......... H04W 4/40 |
| 2020/0189612 A1* | 6/2020 | Shimizu | ............... G05D 1/0061 |
| 2021/0271365 A1 | 9/2021 | Bandishti | |

OTHER PUBLICATIONS

Partial International Search Report—PCT/US2022/075184—ISA/EPO—Dec. 9, 2022.

* cited by examiner

METHOD AND APPARATUS FOR RELATIVE POSITIONING OF A USER EQUIPMENT IN A VEHICLE

BACKGROUND

Background Field

The subject matter disclosed herein relates to wireless communications systems, and more particularly to methods and apparatuses for positioning of mobile devices in a wireless communications system within a vehicle.

Relevant Background

Distracted driving is a major problem today, and user equipment (UE) such as smartphones are a leading cause of distractions. Distracted driving includes any activity that diverts the driver's attention from driving, including talking or texting on a smartphone. Driver distraction may be self-induced. For example, texting is a key distraction, with a large percentage of accidents linked to texting and driving. Driver distraction may also be induced by passenger's in the vehicle, e.g., by displaying or sharing a smart phone in the passenger's possession with the driver, e.g., by placing the smart phone in the vicinity of the driver so that the driver can see the smart phone display.

Current approaches to limit distracted driving often requires user intervention. For example, while some UEs support "driver" modes that allow drivers to opt-into a safer experience, the user still needs to manually enable the driver mode. One barrier to automatically setting the smartphone's mode is being able to automatically detect whether a phone (or other client device) is being operated by the driver. For example, a UE can be registered to a driver, but despite this registration, the UE could be safely operated by a passenger instead of the driver. Alternatively, a UE that may be registered to a passenger and accordingly may not be restricted during vehicle use, but the UE may be operated, displayed or otherwise presented to the driver in a manner that may distract the driver.

Accordingly, it is desirable to accurately detect the presence of a UE in the driver's vicinity or in other designated areas of the vehicle so that appropriate restrictions of the UE and/or restrictions/actions of the vehicle may be taken.

SUMMARY

The relative position of a user equipment (UE) within a vehicle is determined using angular measurements, such as angle of arrival (AOA), and optionally ranging measurements, with respect to a number of wireless transceiver within the vehicle using wideband signals, e.g., with a bandwidth of at least 500 MHz. The relative position of the UE with respect to a personal zone or the steering wheel may be determined based on known positions of the wireless transceivers. If the UE is determined to be within the personal zone, at least one functionality of the UE is restricted to avoid driver distraction and, optionally, the operation of autonomous driving of the vehicle adjusted. If the UE is worn on the driver's wrist the relative position of the UE with respect to the steering wheel may be similarly determined and operation of the vehicle modified if the UE is determined to be outside a threshold distance from the steering wheel, indicating that the driver's hand is not on the steering wheel.

In one implementation, a method performed by a positioning entity in a wireless network in a vehicle for relative positioning a user equipment (UE) within the vehicle, the method comprising: determining a relative position of the UE with respect to at least one wireless transceiver in the wireless network based at least on angular measurements of signals having a bandwidth of at least 500 MHz, the at least one wireless transceiver having a known position relative to a personal zone that is defined in the vehicle; determining if the UE is located inside the personal zone of a driver of the vehicle based on the relative position of the UE with respect to the at least one wireless transceiver; and determining whether to permit at least one functionality of the UE based on whether the UE is determined to be located in the personal zone of the driver of the vehicle.

In one implementation, a positioning entity in a wireless network in a vehicle configured for relative positioning a user equipment (UE) within the vehicle, comprising: at least one wireless transceiver configured to communicate with entities in the wireless network; at least one memory; and at least one processor coupled to the at least one wireless transceiver and the at least one memory, wherein the at least one processor is configured to: determine a relative position of the UE with respect to at least one wireless transceiver in the wireless network based at least on angular measurements of signals having a bandwidth of at least 500 MHz, the at least one wireless transceiver having a known position relative to a personal zone that is defined in the vehicle; determine if the UE is located inside the personal zone of a driver of the vehicle based on the relative position of the UE with respect to the at least one wireless transceiver; and determine whether to permit at least one functionality of the UE based on whether the UE is determined to be located in the personal zone of the driver of the vehicle.

In one implementation, a positioning entity in a wireless network in a vehicle configured for relative positioning a user equipment (UE) within the vehicle, comprising: means for determining a relative position of the UE with respect to at least one wireless transceiver in the wireless network based at least on angular measurements of signals having a bandwidth of at least 500 MHz, the at least one wireless transceiver having a known position relative to a personal zone that is defined in the vehicle; means for determining if the UE is located inside the personal zone of a driver of the vehicle based on the relative position of the UE with respect to the at least one wireless transceiver; and means for determining whether to permit at least one functionality of the UE based on whether the UE is determined to be located in the personal zone of the driver of the vehicle.

In one implementation, a non-transitory storage medium including program code stored thereon, the program code is operable to configure at least one processor in a positioning entity in a wireless network in a vehicle for relative positioning a user equipment (UE) within the vehicle, the program code comprising instructions to: determine a relative position of the UE with respect to at least one wireless transceiver in the wireless network based at least on angular measurements of signals having a bandwidth of at least 500 MHz, the at least one wireless transceiver having a known position relative to a personal zone that is defined in the vehicle; determine if the UE is located inside the personal zone of a driver of the vehicle based on the relative position of the UE with respect to the at least one wireless transceiver; and determine whether to permit at least one functionality of the UE based on whether the UE is determined to be located in the personal zone of the driver of the vehicle.

In one implementation, a method performed by a positioning entity in a wireless network in a vehicle for relative positioning a user equipment (UE) worn by a driver of the vehicle, the method comprising: determining a relative position of the UE worn by the driver of the vehicle with respect to one or more wireless transceivers in the wireless network based at least on round trip time (RTT) ranging or angular measurements of signals having a bandwidth of at least 500 MHz, the one or more wireless transceivers having a known position relative to a steering wheel in the vehicle; determining if the UE worn by the driver is located within a threshold distance to the steering wheel based on the relative position of the UE with respect to the one or more wireless transceivers and the known position of the one or more wireless transceivers relative to the steering wheel; and determining whether to restrict autonomous operation of the vehicle if the UE is determined to be outside the threshold distance to the steering wheel.

In one implementation, a positioning entity in a wireless network in a vehicle configured for relative positioning a user equipment (UE) worn by a driver of the vehicle, comprising: at least one wireless transceiver configured to communicate with entities in the wireless network; at least one memory; and at least one processor coupled to the at least one wireless transceiver and the at least one memory, wherein the at least one processor is configured to: determine a relative position of the UE worn by the driver of the vehicle with respect to one or more wireless transceivers in the wireless network based at least on round trip time (RTT) ranging or angular measurements of signals having a bandwidth of at least 500 MHz, the one or more wireless transceivers having a known position relative to a steering wheel in the vehicle; determine if the UE worn by the driver is located within a threshold distance to the steering wheel based on the relative position of the UE with respect to the one or more wireless transceivers and the known position of the one or more wireless transceivers relative to the steering wheel; and determine whether to restrict autonomous operation of the vehicle if the UE is determined to be outside the threshold distance to the steering wheel.

In one implementation, a positioning entity in a wireless network in a vehicle configured for relative positioning a user equipment (UE) worn by a driver of the vehicle, comprising: means for determining a relative position of the UE worn by the driver of the vehicle with respect to one or more wireless transceivers in the wireless network based at least on round trip time (RTT) ranging or angular measurements of signals having a bandwidth of at least 500 MHz, the one or more wireless transceivers having a known position relative to a steering wheel in the vehicle; means for determining if the UE worn by the driver is located within a threshold distance to the steering wheel based on the relative position of the UE with respect to the one or more wireless transceivers and the known position of the one or more wireless transceivers relative to the steering wheel; and means for determining whether to restrict autonomous operation of the vehicle if the UE is determined to be outside the threshold distance to the steering wheel.

In one implementation, a non-transitory storage medium including program code stored thereon, the program code is operable to configure at least one processor in a positioning entity in a wireless network in a vehicle for relative positioning a user equipment (UE) worn by a driver of the vehicle, the program code comprising instructions to: determine a relative position of the UE worn by the driver of the vehicle with respect to one or more wireless transceivers in the wireless network based at least on round trip time (RTT) ranging or angular measurements of signals having a bandwidth of at least 500 MHz, the one or more wireless transceivers having a known position relative to a steering wheel in the vehicle; determine if the UE worn by the driver is located within a threshold distance to the steering wheel based on the relative position of the UE with respect to the one or more wireless transceivers and the known position of the one or more wireless transceivers relative to the steering wheel; and determine whether to restrict autonomous operation of the vehicle if the UE is determined to be outside the threshold distance to the steering wheel.

BRIEF DESCRIPTION OF THE DRAWING

Non-limiting and non-exhaustive aspects are described with reference to the following figures, wherein like reference numerals refer to like parts throughout the various figures unless otherwise specified.

DETAILED DESCRIPTION

Figure 1:
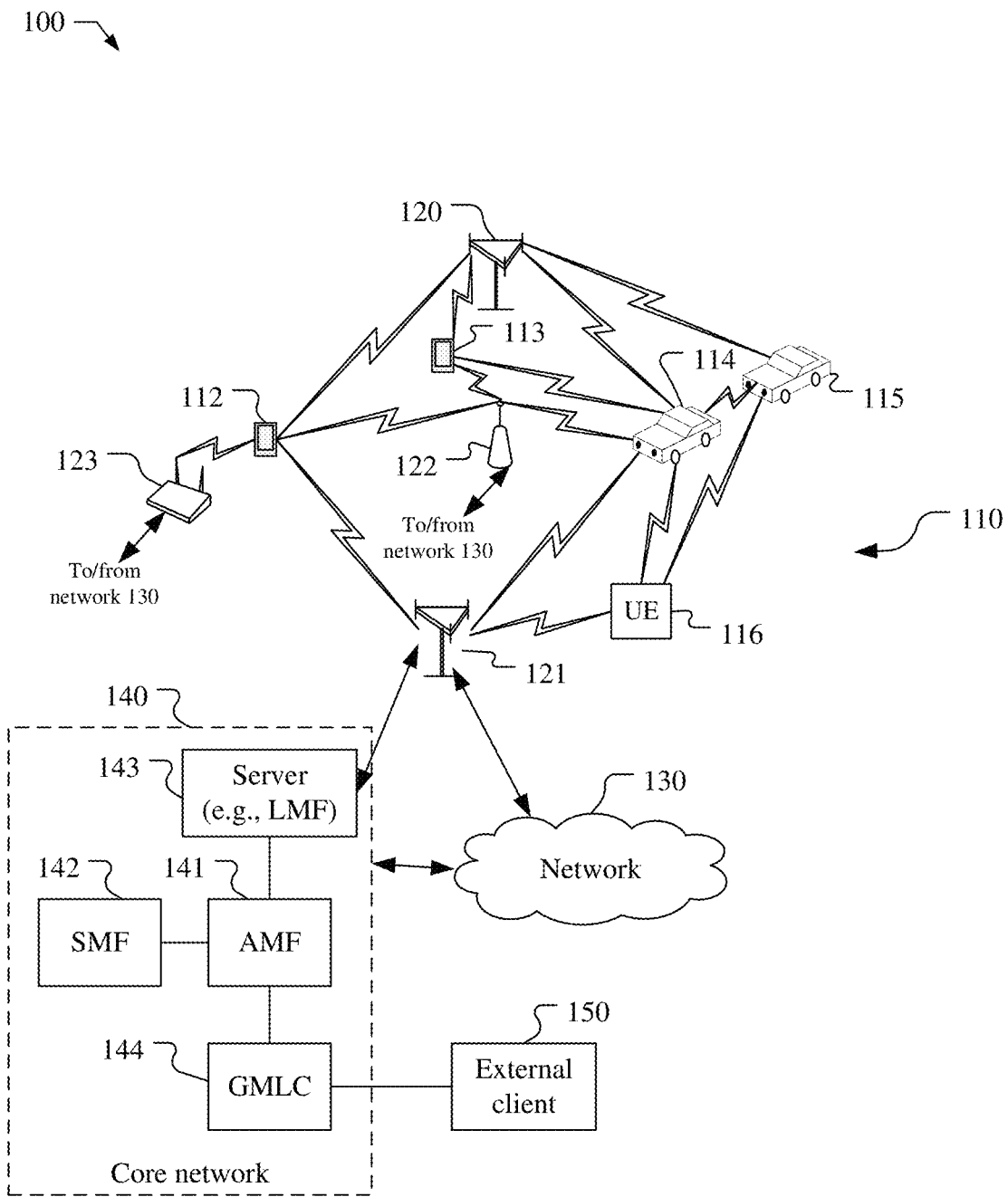
FIG. 1 illustrates a wireless communication environment illustrating wireless communications between various devices includes UEs and base stations.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "UE" and "base station", are not intended to be specific or otherwise limited to any particular radio access technology (RAT), unless otherwise noted. In general, a UE (sometimes referred to as a UE) may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

As noted above, distracted driving is a problem that results in a many accidents, which result in injuries and death. A significant source of distracted driving is due to the use of UEs, such as smartphones, by the driver. Various approaches to reduce driver distractions from smartphones have been proposed. For example, in some approaches positioning of the smartphone within the vehicle has been attempted using positioning based on relatively low bandwidth signals, such as ultrasonic signals or Bluetooth signals. Position accuracy is limited with conventional positioning approaches, which leads to an imprecise personal zone. Other approaches include, e.g., relying on on-board sensors to detect motion patterns of a smartphone for in-vehicle scenarios, which again is relatively inaccurate and may not be desirable to rely on for safety related applications.

Accordingly, devices and techniques described herein are related to accurately and precisely determining a position of a user equipment (UE) within a vehicle and specifically determining when the UE is within a specific area in the vehicle, such as in the vicinity of a driver of the vehicle or near the steering wheel. Accurate positioning of the UE within the vehicle may be performed using wideband (e.g., a bandwidth of at least 500 MHz) radio frequency (RF) signaling between the UE and at least one wireless transceiver in the vehicle, which has a known position to a defined personal zone. Each wireless transceiver may include multiple receive antennas for performing the angular measurements of the signals. An angular measurement, such as angle of arrival (AOA) or angle of departure (AOD), of the wideband signals may be used to determine an accurate position of the UE with respect to the wireless transceivers, which may be used to determine whether the UE is in the personal zone. Additional measurements of the wideband signals, such as ranging measurements, may be performed to further enhance the relative position determination of the UE. If the UE is determined to be within the personal zone, appropriate action on the UE may be performed, such as restricting one or more functionalities of the UE, e.g., disabling one or more aspects of the UE, turning off applications, etc. Additionally, if the UE is determined to be within the personal zone, operation of the vehicle may be altered, such as enabling one or more aspects of driver assistance operations. The use of wideband RF signaling, such as Ultra Wideband (UWB) signaling, is advantageous as it permits highly accurate positioning of the UE within the vehicle, e.g., with an accuracy of 5-7 cm or better, thereby decreasing uncertainty of whether the UE is within a particular personal zone within the vehicle. Moreover, with the use of wideband RF signaling, fewer measurements are required, thereby improving efficiency and power optimization.

In some implementations, the relative position of the UE may be determined with respect to specific zones that are associated with components of the vehicle, such as the steering wheel. For example, the relative position of the UE, which may be a smart watch or other wearable on the driver's wrist, may be used to determine if the UE is within a threshold distance from the steering wheel, e.g., to verify that the driver remains engaged in driving while the vehicle is in autonomous driving mode. If the UE is determined to be outside a threshold distance from the steering wheel, appropriate action may be performed, such as warning the driver, restricting autonomous operation of the vehicle, etc.

FIG. 1 illustrates an example wireless communications environment 100 that includes a wireless communication system 110, including a number of user equipment (UEs) 112, 113, 114, 115, 116, base transceiver stations (BTSs) 120, 121, 122, 123, a network 130, a core network 140, and an external client 150. The core network 140 (e.g., a 5G core network (5GC)) may include back-end devices including, among other things, an Access and Mobility Management Function (AMF) 141, a Session Management Function (SMF) 142, a server 143, and a Gateway Mobile Location Center (GMLC) 144. The AMF 141, the SMF 142, the server 143, and the GMLC 144 are communicatively coupled to each other. The server 143 may be, for example, a Location Management Function (LMF) that supports positioning of the UEs 112-116 (e.g., using techniques such as Assisted Global Navigation Satellite System (A-GNSS), OTDOA (Observed Time Difference of Arrival, e.g., Downlink (DL) OTDOA and/or Uplink (UL) OTDOA), Round Trip Time (RTT), Multi-Cell RTT, RTK (Real Time Kinematic), PPP (Precise Point Positioning), DGNSS (Differential GNSS), E-CID (Enhanced Cell ID), AoA (Angle of Arrival), AoD (Angle of Departure), etc.). The wireless communication system 110 may include additional or alternative components.

An LMF may also be referred to as a Location Manager (LM), a Location Function (LF), a commercial LMF (CLMF), or a value-added LMF (VLMF). The server 143 (e.g., an LMF) and/or one or more other devices of the wireless communication system 110 (e.g., one or more of the UEs 112-116) may be configured to determine locations of the UEs 112-116. The server 143 may communicate directly with the BTS 121 (e.g., a gNB) and/or one or more other BTSs, and may be integrated with the BTS 121 and/or one or more other BTSs. The SMF 142 may serve as an initial contact point of a Service Control Function (SCF) (not shown) to create, control, and delete media sessions. The server 143 (e.g., an LMF) may be co-located or integrated with a gNB or a TRP (Transmission/Reception Point), or may be disposed remote from the gNB and/or TRP and configured to communicate directly or indirectly with the gNB and/or the TRP.

The AMF 141 may serve as a control node that processes signaling between the UEs 112-116 and the core network 140 and provides QoS (Quality of Service) flow and session management. The AMF 141 may support mobility of the UEs 112-116 including cell change and handover and may participate in supporting signaling connection to the UEs 112-116.

The wireless communication system 110 is capable of wireless communication in that components of the wireless communication system 110 can communicate with one another (at least sometimes using wireless connections) directly or indirectly, e.g., via the BTSs 120-123 and/or the network 130 (and/or one or more other devices not shown, such as one or more other base transceiver stations). For indirect communications, the communications may be altered during transmission from one entity to another, e.g., to alter header information of data packets, to change format, etc. The UEs 112-116 shown are a smart device, such as a smartphone or smartwatch, a tablet computer, and a vehicle-based device, but these are examples only as the UEs 112-116 are not required to be any of these configurations, and other configurations of UEs may be used. A smart device, for example, may be any electronic device that is can be generally connected to other devices or networks via different wireless protocols such as Bluetooth, Zigbee, NFC, Wi-Fi, LiFi, 5G, etc., that can operate to some extent interactively and autonomously. The UEs 112, 113 shown are mobile wireless communication devices (although they may communicate wirelessly and via wired connections) including mobile phones (including smartphones) and a tablet computer. The UEs 114 and 115 shown are a vehicle-based mobile wireless communication device (although the UE 114 may communicate wirelessly and via wired connections). The UE 116 is shown as a generic UE and may be one or more types of UEs, whether mobile or not, whether of a type shown or not. For example, the UE 116 may include one or more UEs that are, or may be associated with an entity that is, a typically-static or static device such as a roadside unit (RSU), cash register, an automatic teller machine (ATM), a restaurant or other building, etc. Other types of UEs may include wearable devices (e.g., smart watches, smart jewelry, smart glasses or headsets, etc.). Still other UEs may be used, whether currently existing or developed in the future. Further, other wireless devices (whether mobile or not) may be implemented within the wireless communication system 110 and may communicate with each other and/or with the UEs 112-116, the BTSs 120-123, the network 130, the core network 140, and/or the external client 150. For example, such other devices may include internet of thing (IoT) devices, medical devices, home entertainment and/or automation devices, etc. The core network 140 may communicate with the external client 150 (e.g., a computer system), e.g., to allow the external client 150 to request and/or receive location information regarding the UEs 112-116 (e.g., via the GMLC 144).

The UEs 112-116 or other devices may be configured to communicate in various networks and/or for various purposes and/or using various technologies (e.g., 5G, ultrawideband (UWB), mmWave, Wi-Fi communication, multiple frequencies of Wi-Fi communication), satellite positioning, one or more types of communications (e.g., GSM (Global System for Mobiles), CDMA (Code Division Multiple Access), LTE (Long-Term Evolution), V2X (Vehicle-to-everything e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The wireless communication system 110 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The communication links shown in FIG. 1 are examples and not limiting of the disclosure. The UEs 112-116 may communicate with base stations, with other UEs, etc.

The BTSs 120-123 may wirelessly communicate with the UEs 112-116 in the wireless communication system 110 via one or more antennas. A BTS may also be referred to as a base station, an access point, a gNode B (gNB), an access node (AN), a Node B, an evolved Node B (eNB), etc. For example, each of the BTSs 120, 121 may be a gNB or a transmission point gNB, the BTS 122 may be a macro cell (e.g., a high-power cellular base station) and/or a small cell (e.g., a low-power cellular base station), and the BTS 123 may be an access point (e.g., a short-range base station configured to communicate with short-range technology such as WiFi, WiFi-Direct (WiFi-D), Bluetooth®, Bluetooth®-low energy (BLE), Zigbee, etc. One or more of the BTSs 120-123 may be configured to communicate with the UEs 112-116 via multiple carriers. Each of the BTSs 120, 121 may provide communication coverage for a respective geographic region, e.g. a cell. Each cell may be partitioned into multiple sectors as a function of the base station antennas. A BTS may be any of a variety of forms such as a desktop device, a roadside unit (RSU), etc.

The BTSs 120-123 each comprise one or more Transmission/Reception Points (TRPs). For example, each sector within a cell of a BTS may comprise a TRP, although multiple TRPs may share one or more components (e.g., share a processor but have separate antennas). The wireless communication system 110 may include only macro TRPs or the wireless communication system 110 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

The UEs 112-116 may be referred to as terminals, access terminals (ATs), mobile stations, mobile devices, subscriber units, etc. The UEs 112-116 may include various devices as listed above and/or other devices. The UEs 112-116 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of the UEs 112-116 utilizing D2D communications may be within a geographic coverage area of a TRP such as one or more of the BTSs 120-123. Other UEs in such a group may be outside such geographic coverage areas, or be otherwise unable to receive transmissions from a base station. Groups of the UEs 112-116 communicating via D2D communications may utilize a one-to-many (1:M) system in which each UE may transmit to other UEs in the group. A TRP of the BTSs 120-123 may facilitate scheduling of resources for D2D communications. In other cases, D2D communications may be carried out between UEs without the involvement of a TRP.

The UEs 112-116, such as V-UEs 114 and 115, may use the V2X communication standard, in which information is passed between a vehicle and other entities within the wireless communication network, such RSU 116. The V2X standard aims to develop autonomous or semi-autonomous driving systems, such as Advanced Driver Assistance System (ADAS), which helps drivers with decisions, such as lane changes, speed changes, overtaking speeds, and may be used to assist in parking as discussed herein. The UEs 112-116 may communicate directly, e.g., peer-to-peer messaging, or via one or more intermediate entities, such as via RSU 116 or BTSs 120-123 or network 130 in an infrastructure-based messaging.

In general, there are two modes of operation for V2X services, as defined in Third Generation Partnership Project (3GPP) TS 23.285. One mode of operation uses direct wireless communications between V2X entities when the V2X entities, which may sometimes be referred to as sidelink communication. The other mode of operation uses network based wireless communication between entities. The two modes of operation may be combined, or other modes of operation may be used if desired.

Entities using V2X communications, such as UEs 114 and 115 may operate using direct or indirect wireless communications. For example, the wireless communication may be over, e.g., Proximity-based Services (ProSe) Direction Communication (PC5) reference point as defined in 3GPP TS 23.303, and may use wireless communications under IEEE 1609, Wireless Access in Vehicular Environments (WAVE), Intelligent Transport Systems (ITS), and IEEE 802.11p, on the ITS band of 5.9 GHz, or other wireless connections directly between entities.

Thus, as illustrated, UEs 114 and 115 may directly communicate using with a Vehicle-to-Vehicle (V2V) communication link. UEs 114 and 115 may similarly directly communicate with a roadside unit (RSU), e.g., UE 116, via Vehicle-to-Infrastructure (V2I) communication links. The RSU 116, for example, may be a stationary infrastructure entity, that may support V2X applications and that can exchange messages with other entities supporting V2X applications. An RSU may be a logical entity that may combine V2X application logic with the functionality of base stations in a RAN, such as an eNB, ng-eNB, or eLTE (referred to as eNB-type RSU) or a gNB, or UE (referred to as UE-type RSU). The UEs 114, 115, and 116 may communicate with additional entities, such as additional vehicles, RSUs or with a UE 113, e.g., held by pedestrian using direct communication links.

During direct communications with one or more entities in the V2X wireless communication system 100, each entity may provide V2X information, such as an identifier for the V2X entity, as well as other information in messages such as Common Awareness Messages (CAM) and Decentralized Notification Messages (DENM) or Basic Safety Message (BSM), which may be used for, e.g., ADAS or safety use cases.

In other implementations, UEs 114 and 115 may indirectly communicate with each other, e.g., through the RSU 116 via the V2I communication links, respectively or through other network infrastructure such as BTSs 120-123 and network 130, e.g., using cellular vehicle-to-everything (C-V2X). For example, vehicles may communicate via a base station in a Radio Access Network (RAN), such as an evolved Node B (eNB) or next generation evolved Node B (ng-eNB) in LTE wireless access and/or evolved LTE (eLTE) wireless access or a NR Node B (gNB) in Fifth Generation (5G) wireless access.

In some instances, a UE may be present within a vehicle, and may present a distraction to the driver of the vehicle. Accordingly, it is desirable to know the relative position of the UE within the vehicle to determine whether the UE is within a personal zone in which the UE may distract the driver.

Figure 2:
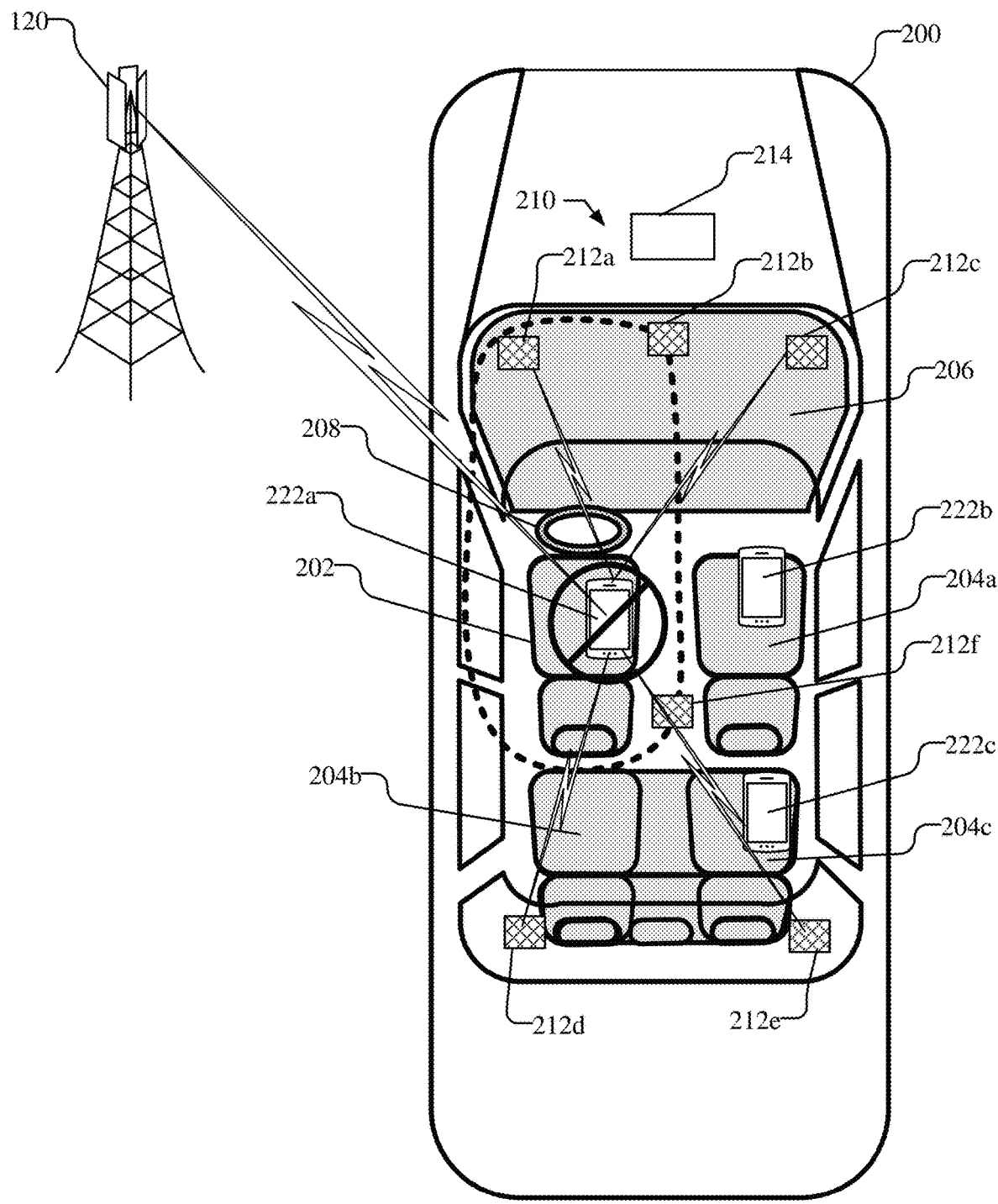
FIG. 2 illustrates a vehicle with a wireless positioning system in which the relative position of a UE is determined with respect to defined areas within the vehicle using Ultra WideBand (UWB) signals.

FIG. 2, by way of example, illustrates a vehicle 200 with a wireless system 210 in which the relative position of a UE with respect to defined areas or zones within the vehicle may be determined using wideband RF signals. Vehicle 200 is illustrated as including, among other things, a driver's seat 202, multiple passenger seats 204a, 204b, 204c (collectively referred to as passenger seats 204), a dashboard 206, and steering wheel 208. A number of UEs 222a, 222b, and 222c (sometimes referred to collectively as UEs 222 or individually as UE 222) are shown as present in the vehicle in various locations, such as the driver's seat 202, and passenger seats 204a and 204c. It should be understood that the UEs 222 may be moved within the vehicle 200. FIG. 2 illustrates a base station 120, which is external to the vehicle 200, which may be communicatively linked to one or more UEs 222.

The wireless system 210 in the vehicle 200 is illustrated as including a plurality of wireless transceivers 212a, 212b, 212c, 212d, 212e, and 212f (collectively referred to as wireless transceivers 212) that may be coupled to the vehicle 200. The wireless transceivers 212, for example, may be in the vehicle 200, inside the passenger compartment of the vehicle 200, outside the passenger compartment of the vehicle 200, outside the vehicle 200, on the vehicle body 200, etc. In some implementations, one or more of the wireless transceivers 212 may be other UEs, e.g., such as a 5G sidelink transceiver. Additionally, the wireless system 210 includes a positioning server 214 that may be connected to the wireless transceivers 212. The wireless transceivers 212 may be configured to receive and/or transmit high bandwidth (e.g., bandwidth of at least 500 MHz) RF signals from and/or to UEs 222. By way of example, the RF signals may be ultra-wideband (UWB) signals, Wi-Fi, cellular signals, mmWave, 60 GHz signals, or any other RF signals that transmit information across a wide bandwidth (e.g., at least 500 MHz). In some implementations, Bluetooth signals may be used, e.g., for High Accuracy Distance Measurement (HADM), e.g., in in addition to or conjunction with the high bandwidth (e.g., UWB) signals or another Radio Access Technology. For sake of convenience, the high bandwidth RF signals may sometimes be referred t herein as UWB signals, but it should be understood that, unless otherwise indicated, the present disclosure is not limited to UWB signals.

The wireless transceivers 212 may be distributed in various locations in the vehicle 200, e.g., in the corners (as illustrated by wireless transceivers 212a, 212c, 212d, and 212e) and in the center (as illustrated by wireless transceivers 212b and 212f). The placement of the wireless transceivers 212 may be based on a personal zone 250 for the driver defined in the vehicle 200, which may be altered based on the driver's seat 202 position. While FIG. 2 illustrates all of the wireless transceivers 212 inside the cabin of the vehicle 200, in some implementations, one or more wireless transceivers 212 may be located outside the cabin of the vehicle 200, e.g., near the bumpers or in the trunk. The wireless transceivers 212 may be dedicated for the wireless system 210 or may be some or all of the wireless transceivers 212 may be used for V2X or other communications with devices external to the vehicle 200.

Each wireless transceivers 212 may one or more antennas. For example, in some implementations, e.g., where the wireless transceivers 212 detect angular measurements, the wireless transceivers 212 include multiple receive antennas and may further include a transmit antenna, e.g., 1×2 antenna array (1 transmit and 2 receive antennas). In an implementation where the wireless transceiver 212 does not detect angular measurements, the wireless transceiver 212 may include a single receive antenna, e.g., a 1×1 antenna array (1 transmit and 1 receive antenna). The use of multiple antennas for receiving RF signals permits an angular measurement (e.g., angle of arrival (AOA) or angle of departure (AOD)) of a received wideband signal transmitted by each UE 222 in the vehicle 200. In some implementations, the UEs 222 may include multiple receive antennas, which may be used to determine the AOA of wideband signals transmitted by each wireless transceiver 212. In some implementations, one or both of the wireless transceivers and the UE 222 may use multiple transmit antennas, e.g., for beam steering.

Additionally, in some implementations, a range between each wireless transceiver 212 and each UE 222 may be determined. The multiple determined angular measurements (and in some implementations, the ranges) for each wireless transceiver 212 and each UE 222 may be used by a positioning entity to determine the relative position of each UE 222 with respect to the wireless transceivers 212. The positioning entity, for example, may be the server 214 in the wireless system 210 or in the UEs 222.

A personal zone 250 may be defined in the vehicle 200 with respect to the known positions of the wireless transceivers 212. The personal zone 250 is a virtual area within the vehicle 200 that identifies the vicinity of a driver or passenger within the vehicle 200. For example, the personal zone 250 of the driver may be defined as an area where a driver may access, see, or otherwise engage a UE 222 in a manner that may be a distraction from driving. For example, the presence of a UE (e.g., UE 222a) in the personal zone 250, for example, may result in distraction of the driver due to the proximity of the UE 222 to the driver, whereas UEs (e.g., UEs 222b and 222c) that are outside the personal zone 250, are unlikely to be a distraction to the driver. The personal zone 250 may be defined or calibrated based on vehicle type (sedan, SUV, commercial), make, model, etc. Moreover, the personal zone 250 may be determined, e.g., based on the position of the driver seat position. For example, the personal zone 250 may be dynamically adjusted based on sensor data for the position of the driver's seat 202. By dynamically adjusting the personal zone 250 based on the position of the driver's seat 202, the personal zone 250 may be controlled to include the driver's seat 202, while maximizing the passenger area outside of the personal zone 250. In some implementations, a personal zone 250 may be defined for the driver with the remaining areas outside the personal zone 250 defined as a passenger zone, while in other implementations, separate personal zones may be defined for each separate passenger.

With the personal zone 250 defined relative to the locations of the wireless transceivers 212, by determining a position of a UE 222 relative to the wireless transceivers 212 based on angular measurements (and in some implementations, ranging), it can be determined whether a UE 222 is within the personal zone 250 of the driver. Moreover, the use of wideband signals for relative position determination is advantageous for as the large amount of signal energy over a wideband permits a positioning accuracy of a few centimeters, e.g., 5-7 cm or better accuracy (90% of time is correct within 7 cm). Accordingly, it is possible to determine whether the UE 222 is located within a defined personal zone 250 with a high degree of accuracy, thus, the personal zone 250 may be defined with a high precision. With use of a precise personal zone 250 and highly accurate positioning, it is possible to avoid improperly permitting the driver to use or access (e.g., view) the UE 222, while permitting continued use of a UE 222 by a passenger, thereby both improving safety and user experience. Moreover, with the use of wideband signaling, fewer measurements are required thereby improving efficiency and power optimization.

Figure 3:
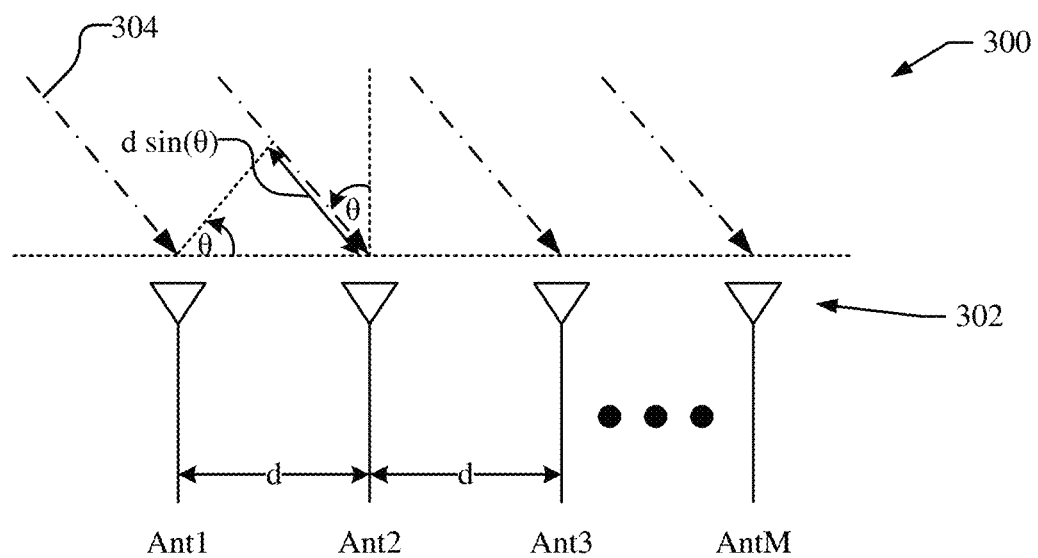
FIG. 3 shows a diagram illustrating a principle of angle of arrival determination for a number of wireless transceivers.

FIG. 3, for example, shows a diagram 300 illustrating a principle of AOA determination using phase difference of arrival (PDOA) for a number of antennas (Ant1, Ant2, Ant3 . . . AntM), which may be a sub-array 302 of receive antennas within a wireless transceiver 212 (or within a UE 222) shown in FIG. 2. The AOA is θ and the distance between pairs of adjacent antennas Ant is d. An incoming signal 304 from a UE 222 (or from an antenna 212) must travel farther to reach each subsequent antenna, and consequently, a phase shift Δφ is introduced. The phase shift Δφ between two adjacent antennas may be determined as:

$$\Delta\phi = -2\pi\frac{d\sin(\theta)}{\lambda} \qquad \text{eq. 1}$$

In equation 1, λ is the wavelength of the signal. Accordingly, the AOA θ may be simply determined as:

$$\theta = \arcsin\left(\frac{\Delta\phi \Box \lambda}{-2\pi d}\right) \quad \text{eq. 2}$$

Each wireless transceiver 212 (or a UE 222) may thereby measure the phase shift Δϕ between adjacent pairs of antennas in a sub-array of antennas to obtain the AOA θ using eq. 2. Equation 2 applies in two dimensions which may be sufficient when the UEs 222 and wireless transceivers 212 are in the same plane (e.g. a horizontal plane). In three dimensions, another set of antennas spaced apart in a second plane perpendicular to the antennas shown in FIG. 3 and may employ equations similar to eq. 2 that also include an AOA in the second plane.

In some implementations, the position of the UE 222 may be additionally or alternatively determined using time difference of arrival (TDOA) for multiple pairs of wireless transceivers 212. Based on TDOA, the difference between the time of arrival (TOA) of the signal transmitted the UE 222 at a reference wireless transceiver 312 and a neighbor wireless transceiver 212 and the range difference between the UE 222 and each of the wireless transceivers 212 defines a hyperbola. By generating hyperbolas for multiple wireless transceiver pairs, the position of the UE 222 relative to the wireless transceiver 212 may be determined based on the intersection of the hyperbolas.

In some implementations, the angular measurement performed by a wireless transceiver 212 or UE 222 may be measurement of a beam sweep performed by the transmitting device, e.g., such as an angle of departure (AOD) measurement. For example, a wireless transceiver 212 may perform a beam sweep of the vehicle, which is received and measured by the UE 222 (e.g., AOD measurement) to determine whether the UE 222 is in the personal zone of the driver or passenger. Alternatively, the UE 222 may perform a beam sweep of the vehicle, which is received and measured by the wireless transceiver 212 (e.g., AOD measurement) to determine whether the UE 222 is in the personal zone of the driver or passenger.

Figure 4:
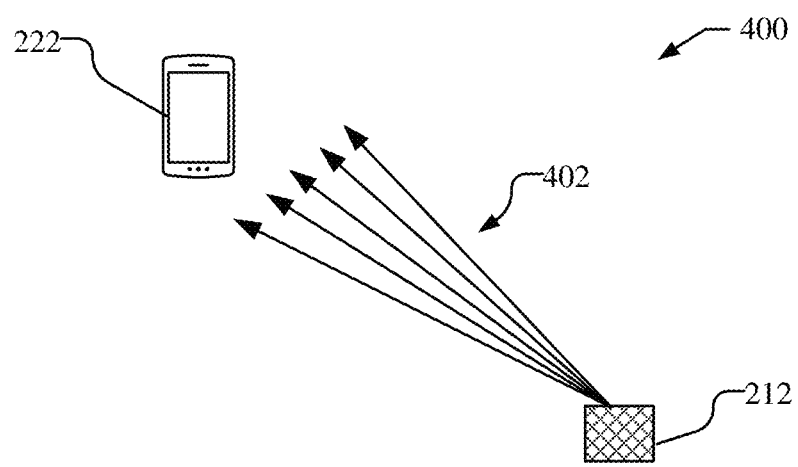
FIG. 4 shows a diagram illustrating a principle of angle of departure determination.

FIG. 4, for example, shows a diagram 400 illustrating a principle of AOD determination by a UE 222 for wideband signals 402 transmitted by a wireless transceiver 212, but it should be understood that the wireless transceiver 212 may measure AOD for wideband signals transmitted by the UE 222. The transmitting entity, e.g., the wireless transceiver 212 or the UE 222, includes multiple transmit antennas for beamforming the transmitted signals. As illustrated, the wireless transceiver 212 transmits a number of beams 402 using transmit beamforming. In transmit beamforming, the transmitting node, e.g., the wireless transceiver 212 or the UE 222, uses multiple transmit antennas to change the directionality of each beam by controlling the phase and relative amplitude by each antenna to create a beam of radio frequency waves that can be "steered" to point in different directions, without actually moving the antennas. Specifically, with the correct phase relationship the radio waves from the separate antennas add together to increase the radiation in a desired direction, while cancelling to suppress radiation in undesired directions. The receiving node, e.g., UE 222 or wireless transceiver 212, does not need an array of receive antennas to detect the transmitted beams.

Each signal beam may be encoded with an identifier, which is correlated with the AOD of the signal beam. The UE 222 measures, e.g., the signal strength of each received beam to identify the signal beam that is best directed towards the UE 222. Based on the identification of the best signal beam by the UE 222 and the beam identifier, the AOD may be measured. For example, the correlation of beam directions (angles) and beam identifiers may be known by the positioning entity, and the UE 222 may provide the beam identifier for the AOD measurement, which the positioning entity may correlate with beam direction transmitted by the wireless transceiver 212.

Additionally, in some implementations, a range between each UE 222 and each wireless transceiver 212 may be determined. The range between each UE 222 and each wireless transceiver 212 may be determined based on a round trip time (RTT) measurement.

Figure 5:
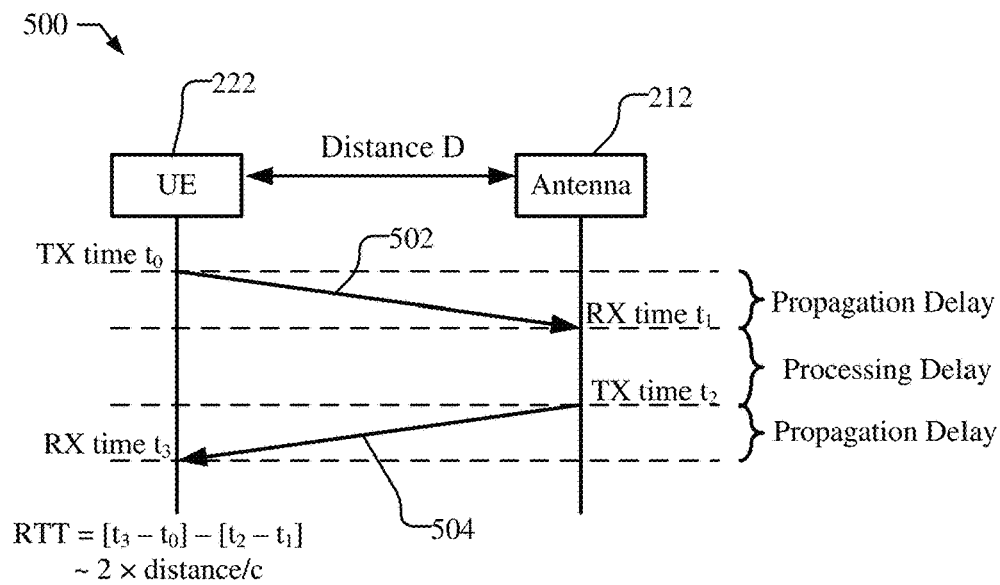
FIG. 5 shows a diagram illustrates a round trip time ranging procedure.

FIG. 5, by way of example, illustrates an RTT process 500 between a UE 222 and wireless transceiver 212, which are separated by a distance D. As illustrated, the UE 222 may transmit a wideband signal 502 to the wireless transceiver 212 at with a transmission Tx time $t_0$, which is received by the wireless transceiver 212 at receive Rx time $t_1$. The propagation delay (e.g., time of flight) of the wideband signal 502 between the UE 222 and the wireless transceiver 212 is the difference between the reception time and the transmission time ($t_1-t_0$). After a processing delay, the wireless transceiver 212 transmits a return wideband signal 504 to the UE 222 with a Tx time $t_2$, which is received by the UE 222 at Rx time $t_3$. The propagation delay (e.g., time of flight) of the wideband signal 504 between the wireless transceiver 212 and the UE 222 is the difference between the reception time and the transmission time ($t_2-t_3$). The wireless transceiver 212 may measure and report the Rx-Tx time difference between receiving signal 502 and transmitting signal 504, i.e., $t_2-t_1$, while the UE 222 may measure and report the Rx-Tx time difference between transmitting signal 502 and receiving signal 504, i.e., $t_3-t_0$. The RTT is determined based on the difference between the Rx-Tx time differences (i.e., RTT=$[t_3-t_0]-[t_2-t_1]$), and the distance (range) between UE 222 and wireless transceiver 212 is RTT*c/2 (where c is the speed of the signal propagation, e.g., speed of light). It should be understood that other types of RTT procedures may be used if desired.

Figure 6:
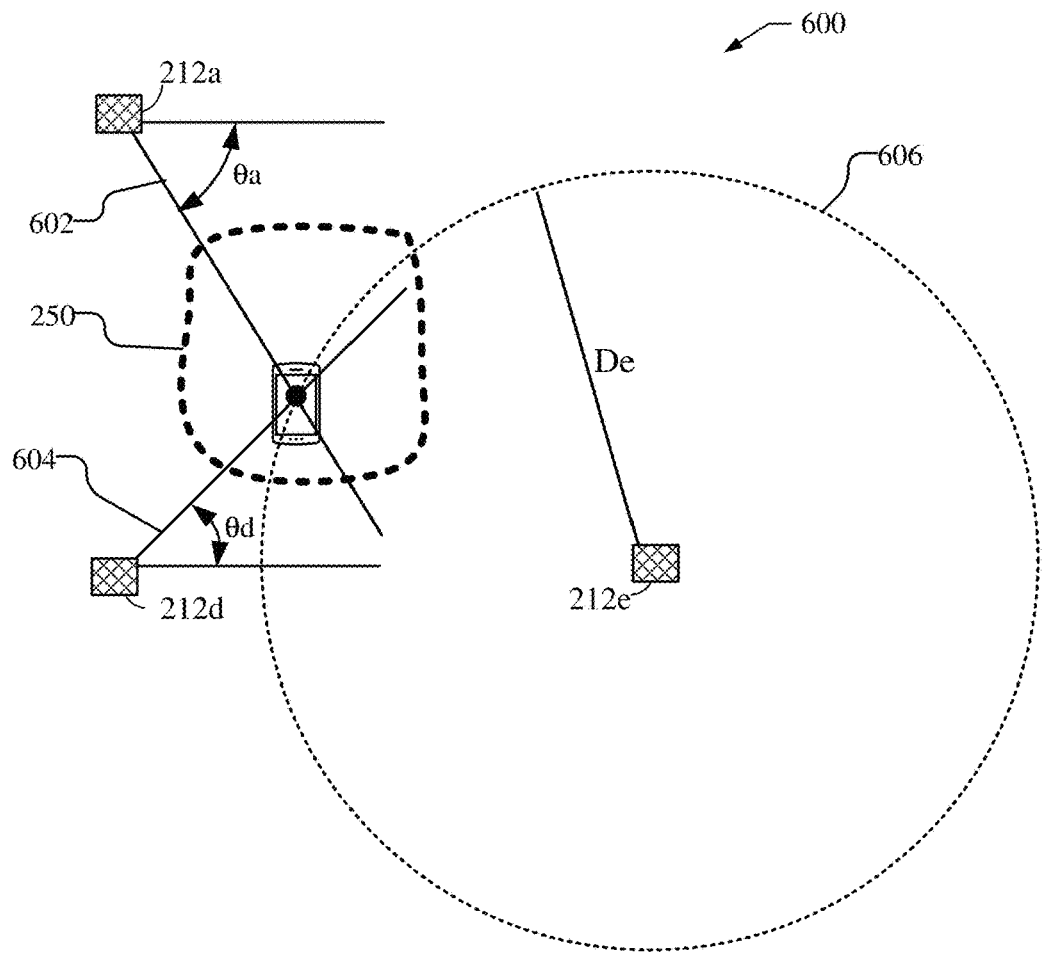
FIG. 6 illustrates relative position determination of a UE with respect to a number of wireless transceivers using angular measurements and a ranging measurement.

FIG. 6 illustrates relative position determination of a UE 222 with respect to a number of wireless transceivers, e.g., wireless transceivers 212a, 212d, and 212e using an angular measurement and a ranging measurement. As illustrated, an angular measurement, such as AOA or AOD, by wireless transceiver 212a may determine that the UE 222 is at an angle θa with respect to a reference direction, and wireless transceiver 212d may determine that the UE 222 is at an angle θd with respect to a reference direction. The UE 222 is at an intersection of the lines 602 and 604 defined by angles θa and θd, respectively. Additionally, as illustrated, wireless transceiver 212e may determine that the UE 222 is at a distance De with respect to the position of wireless transceiver 212, which defines a circle 606, which intersects lines 602 and 604. The use of multiple measurements, e.g., angular measurements from at least one wireless transceiver 212, and optionally range measurements with respect to one or more of the same or different wireless transceivers 212 increases the accuracy of position of the UE 222.

In some implementations, the UE 222 may be determined to be inside or outside a defined personal zone 250 based on the relative position of the UE 222 with respect to the wireless transceivers 212. For example, the relative position of the UE 222 within the vehicle may be determined based on the multiple angular measurements (and range measurements), and then it may be determined whether the relative position of the UE 222 is within the defined personal zone 250. In other implementations, the personal zone 250 may be defined based on a range of angles for each wireless transceiver 212, and the UE 222 may be determined to be within the personal zone 250 if the UE 222 is within the defined range of angles for each wireless transceiver 212.

In some implementations, state information or positional/orientation data provided by sensors may be used to determine whether the UE 222 should be considered within the personal zone 250. For example, if the UE 222 is in an off or standby state while in the vicinity of the driver, the UE 222 may not be considered to be located within the personal zone 250. In another example, if the UE 222 is oriented face down, or located within a pocket or purse, or otherwise in a position where the driver cannot access the UE 222 or be distracted by the UE 222, the UE 222 may not be considered to be located within the personal zone 250. Sensor data, such as ambient light sensor, camera, or inertial sensors, such as accelerometers or gyroscopes may be used to determine the position and/or orientation of the UE 222.

In operation, the relative position of the UE 222 may be triggered when a change in position, orientation or state is detected by the UE 222. For example, when the UE 222 detects movement, e.g., change in physical orientation or position, via on board sensors, such as accelerometers, gyroscopes, camera, etc., the determination of the relative position of the UE 222, and whether the UE 222 is located in the personal zone 250, may be triggered. In another example, if the UE 222 changes state, e.g., is unlocked, turned on, unpaused, etc., the determination of the relative position of the UE 222, and whether the UE 222 is located in the personal zone 250, may be triggered. The determination of the relative position of the UE 222 and whether it is in the personal zone 250 may continue for a predetermined amount of time after physical movement of the UE 222 is no longer detected or until the UE 222 is turned off, locked, etc.

If the UE 222 is determined to not be in the personal zone 250, i.e., the UE 222 is outside the personal zone 250, operation of the UE 222 and the vehicle 200 may not be altered. If, however, the UE 222 is determined to be within the personal zone 250, operation of the UE 222 and/or the vehicle 200 may be adjusted. For example, when the UE 222 is detected within the personal zone 250, one or more functionalities of the UE 222 may be restricted, e.g., the UE 222 may be locked, placed in a sleep mode, the displayed turned off, touchscreen controls disabled, applications (such as videos) paused, applications turned off, an active call converted to speaker mode, transfer any actions through a vehicle interface, etc. Additionally, when the UE 222 is detected within the personal zone 250, the UE 222 additional functionality may be enabled, such as providing warning indicators, e.g. audible alarms, flashing screen, vibration, etc., to indicate to the driver that the UE 222 should be placed outside the personal zone 250. Additionally, when the UE 222 is detected within the personal zone 250 various actions may be taken with respect to the vehicle. For example, various driver assistance operations of the vehicle may be activated. In one example, a warning, such as an alarm or prompt to alert the driver and passengers may sound. In one example, one or more advanced driver-assistance systems (ADAS) may be automatically engaged, such as one or more of adaptive cruise control, lane departure warning, lane-keeping assistance, lane-centering assistance, forward collision warning, traffic signal recognition, or a combination thereof. In one example, autonomous driving of the vehicle may be automatically engaged. The autonomous driving of the vehicle, for example, may automatically slow the vehicle and drive the vehicle to a safe location where the vehicle can be stopped until the UE 222 is removed from the personal zone and the driver is no longer distracted.

In some implementations, it may be desirable to determine whether the driver's hand is in proximity to the steering wheel, e.g., for some ADAS applications, such as autonomous driving, lane-keeping assistance, or lane-centering assistance. Currently, for example, piezo sensors within the steering wheel may be used to detect the presence of the driver's hand on the steering wheel. The use of positioning of a UE 222 using wideband signals as described herein may also or alternatively be used to detect the presence of the driver's hand on or near the steering wheel.

Figure 7:
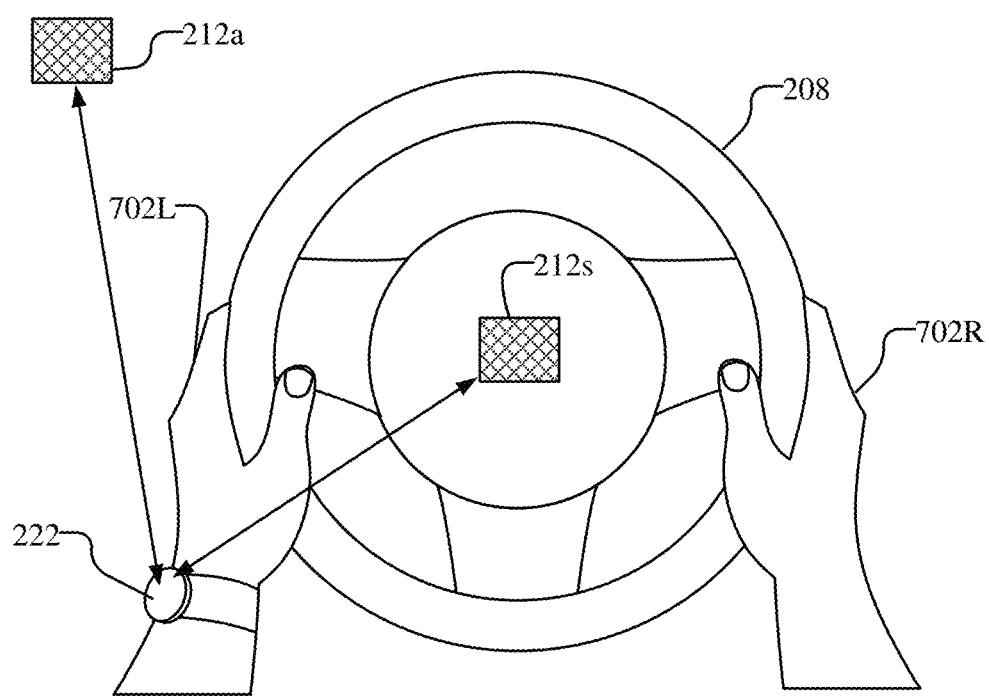
FIG. 7 illustrates a wireless positioning system in which the relative position of a UE on a driver's wrist is determined with respect to the steering wheel using UWB signals.

FIG. 7, by way of example, illustrates a driver's hands 702L, 702R (collectively sometimes referred to as hands 702) engaged with a steering wheel 208. A UE 222, e.g., in the form of a smart watch, is illustrated as worn on the wrist of the driver's hand 702L. The UE 222 may be any wearable that is located near the driver's hand 702L or 702R. A wireless transceiver 212s that is positioned on the steering wheel 710 may be used to receive wideband signals transmitted by the UE 222, or vice versa, the UE 222 may receive wideband signals transmitted by the wireless transceiver 212s. A range between the UE 222 and the wireless transceiver 212s may be determined, e.g., using RTT, discussed above, to determine whether the UE 222 is within a threshold distance from the wireless transceiver 212s, and thus, the steering wheel 710. With the UE 222 worn on a driver's wrist, the threshold distance to the steering wheel may be selected to provide an indication that the hand 702L of the driver is on or near the steering wheel, e.g., to verify that the driver remains engaged in driving while the vehicle is in autonomous driving mode. For example, if the UE is outside the threshold distance from the steering wheel for more than a threshold amount of time, it may be an indication that the driver is not focused on driving. In some implementation, additional or other wireless transceivers, illustrated as wireless transceiver 212a, located in other locations within the vehicle with known positional relationships to the steering wheel 208, may be used to determine the relative position of the UE 222 with respect to the wireless transceivers and thus, the steering wheel, e.g., using angular measurements (AOA or AOD) and/or range measurements, and whether the UE 222 is within a threshold distance from the steering wheel 710.

If the UE 222 is within a threshold distance from the steering wheel 710, the continued operation of the vehicle, including any ADAS applications, is permitted. If, however, the UE 222 is detected outside the threshold distance from the steering wheel 710, e.g. for longer than a threshold amount of time, it may be determined whether the operation of the vehicle, and in particular ADAS applications should be altered. For example, in some implementations, additional conditions may be checked to determine if the driver is focused on driving, before altering operation of the vehicle. For example, if the driver is detected to be controlling the gas pedal or brake, or controlling the steering wheel with a different hand, then operation of the vehicle may not be altered. In some implementations, alteration of the operation of the vehicle may include, e.g., a warning, such as an alarm or prompt to alert the driver to place hands on the steering wheel may sound. In another example, the level of the ADAS applications may be increased. For example, if lane departure warning is engaged, the ADAS may increase to lane-keeping assistance or lane-centering assistance if the UE 222 is detected outside the threshold distance from the steering wheel 710. In some implementations, the ADAS application may increase to autonomous driving. Moreover, with autonomous driving of the vehicle engaged, the vehicle may be automatically controlled to slow the vehicle and drive the vehicle to a safe location where the vehicle can be stopped until or unless the driver holds the steering wheel, i.e., the UE 222 is within a threshold distance from the steering wheel 710.

Figure 8:
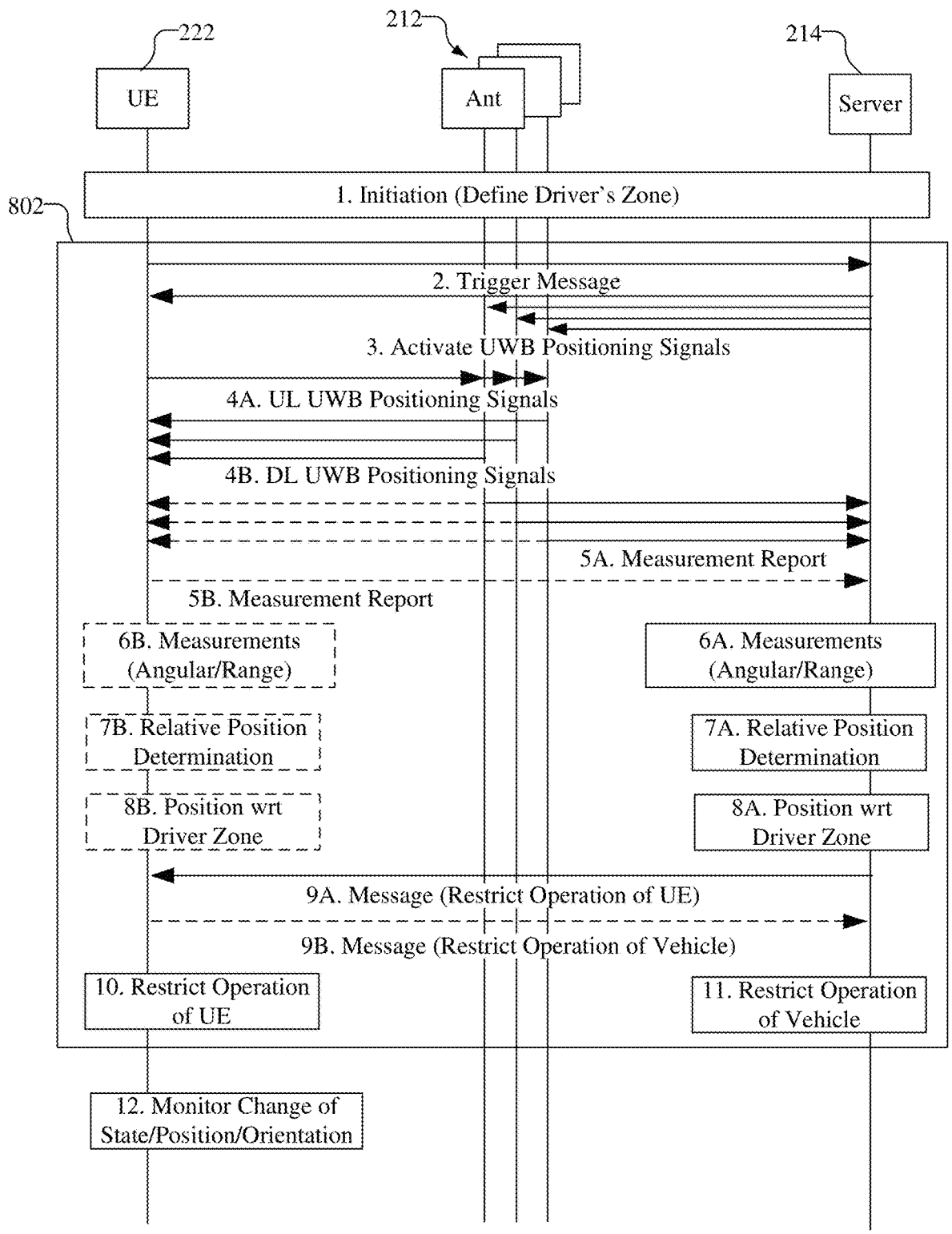
FIG. 8 shows a signal flow illustrating an example of determining a relative position of a UE within a vehicle using UWB signaling.

FIG. 8 shows a signal flow 800 illustrating an example of determining a relative position of a UE within a vehicle using wideband signaling, as discussed herein. FIG. 8 illustrates wideband signaling transmitted between a UE 222 and a wireless system including at least one wireless transceiver 212 and server 214. FIG. 8, by way of example, illustrates multiple wireless transceivers 212, but it should be understood that one or more wireless transceivers 212 may be used. It should be understood that FIG. 8 illustrates an example of various signals and processes that may be performed during the relative positioning of the UE 222 within a vehicle. Is some implementations, additional signals, messages or processes may be used, while in other implementations, fewer signals, messages or processes may be used. Moreover, FIG. 8 is generally described in terms of determining whether the UE 222 is within a personal zone in the vehicle, but the signal flow shown in FIG. 8, or a similar signal flow may be used to determine whether the UE 222 is proximate to the steering wheel, as discussed in FIG. 7.

At stage 1, an initiation process between the UE 222, wireless transceivers 212, and the server 214 is performed. The initiation process, for example, may be performed with introduction of a UE 222 to the vehicle, e.g., being physically moved into the vehicle or turned on while in the vehicle. The initiation process, for example, may include an initial pairing or handshake between the UE 222 and server 214 for positioning. The initiation process may include defining the personal zone, e.g., based on the type of vehicle, the make and model of the vehicle, etc. The personal zone may be dynamically adjusted based on the driver seat position. The personal zone may be pre-calibrated and stored in server 214. During the initiation process, the server 214 may provide assistance data to the UE 222 if the UE 222 is to determine its relative position in the vehicle. For example, the assistance data may include data providing a relative positional relationship between each wireless transceiver 212 and the defined personal zone (and/or steering wheel). For example, the relative position relationship may include a range of angles, range of distances, or a combination thereof between the wireless transceiver and the personal zone (and/or steering wheel). In some implementations, the relative positions of each wireless transceiver within the vehicle may be provided along with the relative area (e.g., polygon) that defines the personal zone. In some implementations, the initiation process, including the transfer of assistance data including the relative positions of the wireless transceivers 212 with respect to the personal zone may be performed using wideband signaling or using another wireless systems, such as Bluetooth. In some implementations, the initiation process, including the transfer of assistance data including the relative positions of the wireless transceivers 212 with respect to the personal zone may be performed using wired connections, e.g., via a USB (Universal Serial Bus) connection for CarPlay or Android Auto. In some implementations, the assistance data including the relative positions of the wireless transceivers 212 with respect to the personal zone may be stored in UE 222 so that the assistance data need not be transferred each time the UE 222 is in the vehicle.

Block 802 illustrates a relative positioning process of the UE 222 within the vehicle. The determination of the relative position of the UE 222 and whether it is in the personal zone 250 may be performed in a positioning entity, such as the server 214 or in the UE 222.

At stage 2, the UE 222 may provide a trigger message to the server 214, via wideband signaling or other types of signaling, such as Bluetooth. The trigger message, for example, may provide an indication of change in position or state change to the server 214 to initiate a positioning sessions, whether the positioning entity is the server 214 or the UE 222. In some implementations, the trigger may be the initiation process, illustrated in stage 1, and thus a separate trigger message may not be necessary for an initial determination of the relative position of the UE 222.

At stage 3, the server 214 may be an activate wideband signals in the UE 222, the wireless transceivers 212, or both. The determination of the relative position of the UE 222 may be based on uplink (UL) wideband signals transmitted by the UE 222 and received by the wireless transceivers 212 or based on downlink (DL) wideband signals transmitted by the wireless transceivers 212 and received by the UE 222, and in some implementations based on both. The server 214, for example, may provide an indication to the UE 222 to begin transmission of UL wideband signals and prepare the wireless transceivers 212 to being measuring, e.g., angular measurements (and in some implementations, ranging measurements) of the UL wideband signals. In another example, the server 214 may provide an indication to the wireless transceivers 212 to begin transmission of DL wideband signals and prepare the UE 222 to being measuring, e.g., angular measurements (and in some implementations, ranging measurements) of the DL wideband signals.

At stage 4A, the UE 222 may transmit UL wideband signals and the wireless transceivers 212 receive the UL wideband signals for relative positioning of the UE 222 within the vehicle, as discussed herein. The UL wideband signals, for example, may be reference signals or may include known reference signal patterns, such as uplink positioning reference signals (PRS) or sounding reference signals for positioning (SRS-Pos). In some implementations, the UE 222 may begin transmitting wideband signals unprompted from the server 214, e.g., when the UE 222 transmits an indication of a trigger to the server 214.

At stage 4B, the wireless transceivers 212 may transmit DL wideband signals and the UE 222 receives the DL wideband signals for relative positioning of the UE 222 within the vehicle, as discussed herein. The DL wideband signals, for example, may be reference signals or may include known reference signal patterns, such as DL positioning reference signals (PRS). It should be understood that in some implementations, on the UL wideband signals may be transmitted by UE 222 in stage 4A or the DL wideband signals may be transmitted by the wireless transceivers 212 in stage 4B. In some implementations, both the UL wideband signals and the DL wideband signals may be transmitted, e.g., for angular measurements from both the wireless transceiver 212 and the UE 222 respectively, and in some implementations for ranging measurements, e.g., with the UL wideband signals from the UE 222 initiating the ranging procedure. In some implementations, if both the UL wideband signals and the DL wideband signals are transmitted, the order of stages 4A and 4B may be switched. For example, the DL wideband signals from the wireless transceivers 212 in stage 4B may be sent before stage 4A and may initiate the ranging procedure (if used).

At stage 5A, the wireless transceivers 212 may provide the measurements of the wideband signaling (e.g., angular related measurement data for UL wideband signals from stage 4A and optionally ranging data) to the server 214, assuming the server 214 is the positioning entity. In implementations, where the UE 222 is the positioning entity, the wireless transceivers 212 (or server 214) may provide the measurements of the wideband signaling to the UE 222.

At stage 5B, the UE 222 may provide the measurements of the wideband signaling (e.g., angular related measurement data for DL wideband signals from stage 4B and optionally ranging data) to the server 214, assuming the server 214 is the positioning entity. In implementations, where the UE 222 is the positioning entity, the UE 222 need not provide the measurements of the wideband signaling to the UE 222 and stage 5B need not be performed.

At stage 6A, the server 214 may generate the measurements for the UE 222 and each of the wireless transceivers 212 based on the data received in stage 5A and optional stage 5B, e.g., if the server 214 is the positioning entity. The server 214, for example, may generate angular measurements, such as AOA or AOD, as discussed in FIGS. 3 and 4. The server 214 may additionally generate range determination, e.g., using RTT, for the UE 222 and one or more wireless transceivers 212. For example, for determining proximity of the UE 222 to a steering wheel, the server 214 may rely on a range determination with respect to a single wireless transceiver 212 on the steering wheel or multiple wireless transceivers, and may additionally use angular measurements.

At stage 6B, the UE 222 may generate the measurements for the UE 222 and each of the wireless transceivers 212 based on the measurements from the DL wideband signals in stage 4B and data received from in stage 5A, e.g., if the UE 222 is the positioning entity. The UE 222, for example, may generate angular measurements, such as AOA or AOD, as discussed in FIGS. 3 and 4. The UE 222 may additionally generate range determination, e.g., using RTT, for the UE 222 and one or more wireless transceivers 212. For example, for determining proximity of the UE 222 to a steering wheel, the UE 222 may rely on a range determination with respect to a single wireless transceiver 212 on the steering wheel or multiple wireless transceivers, and may additionally use angular measurements.

At stage 7A, the server 214 may determine a relative position of the UE 222 within the vehicle based on the measurements from stage 6A, e.g., if the server 214 is the positioning entity. The relative position of the UE 222, for example, may be determined based on multi-angulation based on the angular measurements generated in stage 6A. The relative position of the UE 222 may additionally or alternatively (e.g., for proximity to steering wheel determination) based on multilateration based on the range measurements generated in stage 6A.

At stage 7B, the UE 222 may determine a relative position of the UE 222 within the vehicle based on the measurements from stage 6B, e.g., if the UE 222 is the positioning entity. As discussed above, the relative position of the UE 222, for example, may be determined based on multi-angulation based on the angular measurements generated in stage 6A. The relative position of the UE 222 may additionally or alternatively (e.g., for proximity to steering wheel determination) based on multilateration based on the range measurements generated in stage 6B.

At stage 8A, the server 214 may determine the position of the UE 222 with respect to the personal zone based on the determined relative position of the UE 222 from stage 7B, and a known positional relationship between the wireless transceivers and the personal zone, e.g., if the server 214 is the positioning entity. In some implementations, as discussed above, the relationship between the wireless transceivers and personal zone may be defined as a range of angles and/or ranges with respect to each wireless transceiver 212, and the position of the UE 222 with respect to the personal zone based may be determined based on the UE 222 falling within the range of angles and/or ranges with respect to each wireless transceiver 212. In such an implementation, the relative position of the UE 222 within the vehicle may not need be determined in stage 7A. The position of the UE 222 with respect to the steering wheel, e.g., whether the UE 222 is within a threshold distance from the steering wheel, may be similarly determined based known known positional relationship between the wireless transceivers and the steering wheel. For example, the server 214 may determine whether the UE 222 is within a threshold distance to the steering wheel based on a range to a wireless transceiver or based on a defined relative position of the UE with respect to a number of wireless transceivers and known position of the steering wheel, or based on a defined range of angles and/or ranges from one or more wireless transceivers 212 that define a threshold area around the steering wheel.

At stage 8B, the UE 222 may determine the position of the UE 222 with respect to the personal zone based on the determined relative position of the UE 222 from stage 7B, and a known positional relationship between the wireless transceivers and the personal zone, e.g., if the UE 222 is the positioning entity. In some implementations, as discussed above, the relationship between the wireless transceivers and personal zone may be defined as a range of angles and/or ranges with respect to each wireless transceiver 212, and the position of the UE 222 with respect to the personal zone based may be determined based on the UE 222 falling within the range of angles and/or ranges with respect to each wireless transceiver 212. In such an implementation, the relative position of the UE 222 within the vehicle may not need be determined in stage 7A. The position of the UE 222 with respect to the steering wheel, e.g., whether the UE 222 is within a threshold distance from the steering wheel, may be similarly determined based known known positional relationship between the wireless transceivers and the steering wheel. For example, the server 214 may determine whether the UE 222 is within a threshold distance to the steering wheel based on a range to a wireless transceiver or based on a defined relative position of the UE with respect to a number of wireless transceivers and known position of the steering wheel, or based on a defined range of angles and/or ranges from one or more wireless transceivers 212 that define a threshold area around the steering wheel.

At stage 9A, the server 214 may send a message to the UE 222 to restrict operation of the UE 222, e.g., based on a determination that the UE 222 is within the personal zone or outside a threshold distance from the steering wheel, as determined in stage 8A, e.g., if the server 214 is the positioning entity. In some implementations, the message to restrict operation may be sent to the UE 222 using wideband signaling or using another wireless systems, such as Bluetooth, or using wired connections, e.g., via a USB (Universal Serial Bus) connection for CarPlay or Android Auto. The server 214 need not send a message to the UE 222 to restriction operation of the UE 222 if the UE 222 is not within the personal zone or is within a threshold distance from the steering wheel, as determined in stage 8A.

At stage 9B, the UE 222 may send a message to the server 214 to restrict operation of the vehicle, e.g., based on a determination that the UE 222 is within the personal zone or outside a threshold distance from the steering wheel, as determined in stage 8B, e.g., if the UE 222 is the positioning entity. In some implementations, the message to restrict operation may be sent to the server 214 using wideband signaling or using another wireless systems, such as Bluetooth, or using wired connections, e.g., via a USB (Universal Serial Bus) connection for CarPlay or Android Auto. The UE 222 need not send a message to the server 214 to restriction operation of the vehicle if the UE 222 is not within the personal zone or is within a threshold distance from the steering wheel, as determined in stage 8B.

At stage 10, the UE 222 may restrict operation in response to the message received at stage 9A (if the server 214 is the positioning entity) or in response to a determination that the UE 222 is within the personal zone or outside a threshold distance from the steering wheel, as determined in stage 8B, e.g., if the UE 222 is the positioning entity. For example, in response to a determination that the UE 222 is within the personal zone, the UE 222 may be locked, placed in a sleep mode, the displayed turned off, touchscreen controls disabled, applications (such as videos) paused, applications turned off, an active call converted to speaker mode, transfer any actions through a vehicle interface, etc. If the UE 222 is detected outside the threshold distance from the steering wheel 710, the UE 222 may be caused to sound an alarm or warning, vibrate, or provide with driver with other indication to place a hand on the steering wheel.

At stage 11, the server 214 may interface with the vehicle and cause adjust or alter operation of the vehicle response to the message received at stage 9B (if the UE 222 is the positioning entity) or in response to a determination that the UE 222 is within the personal zone or outside a threshold distance from the steering wheel, as determined in stage 8A, e.g., if the server 214 is the positioning entity. For example, in response to a determination that the UE 222 is within the personal zone, various driver assistance operations of the vehicle may be activated or altered. For example, an alarm or prompt to alert the driver and passengers may sound, one or more ADAS may be automatically engaged or altered (e.g., ADAS level increased), such as one or more of adaptive cruise control, lane departure warning, lane-keeping assistance, lane-centering assistance, forward collision warning, traffic signal recognition, or a combination thereof, or autonomous driving may be automatically engaged. The autonomous driving of the vehicle, for example, may automatically slow the vehicle and drive the vehicle to a safe location where the vehicle can be stopped until the UE 222 is removed from the personal zone and the driver is no longer distracted.

At stage 12, the UE 222 may monitor for changes in in position or orientation, e.g., based on sensor data, and monitor for changes in state. For example, the relative positioning process of the UE 222 within the vehicle illustrated in block 802 may continue until the UE 222 is determined to be stationary relative to the vehicle or in a state where the UE 222 will not distract the driver, e.g., off or in standby. In some implementations, the relative positioning process of block 802 may continue for a predetermined amount of time after the position or orientation of the UE 222 is determined to be stationary. Once the UE 222 is stationary relative to the vehicle, the UE 222 may monitor for changes in in position or orientation, e.g., via on board sensors, such as accelerometers, gyroscopes, camera, etc., and monitor for changes in state, e.g., unlocked, turned on, unpaused, etc. Upon detecting a change in position, orientation, or state, block 802 may be repeated.

Figure 9:
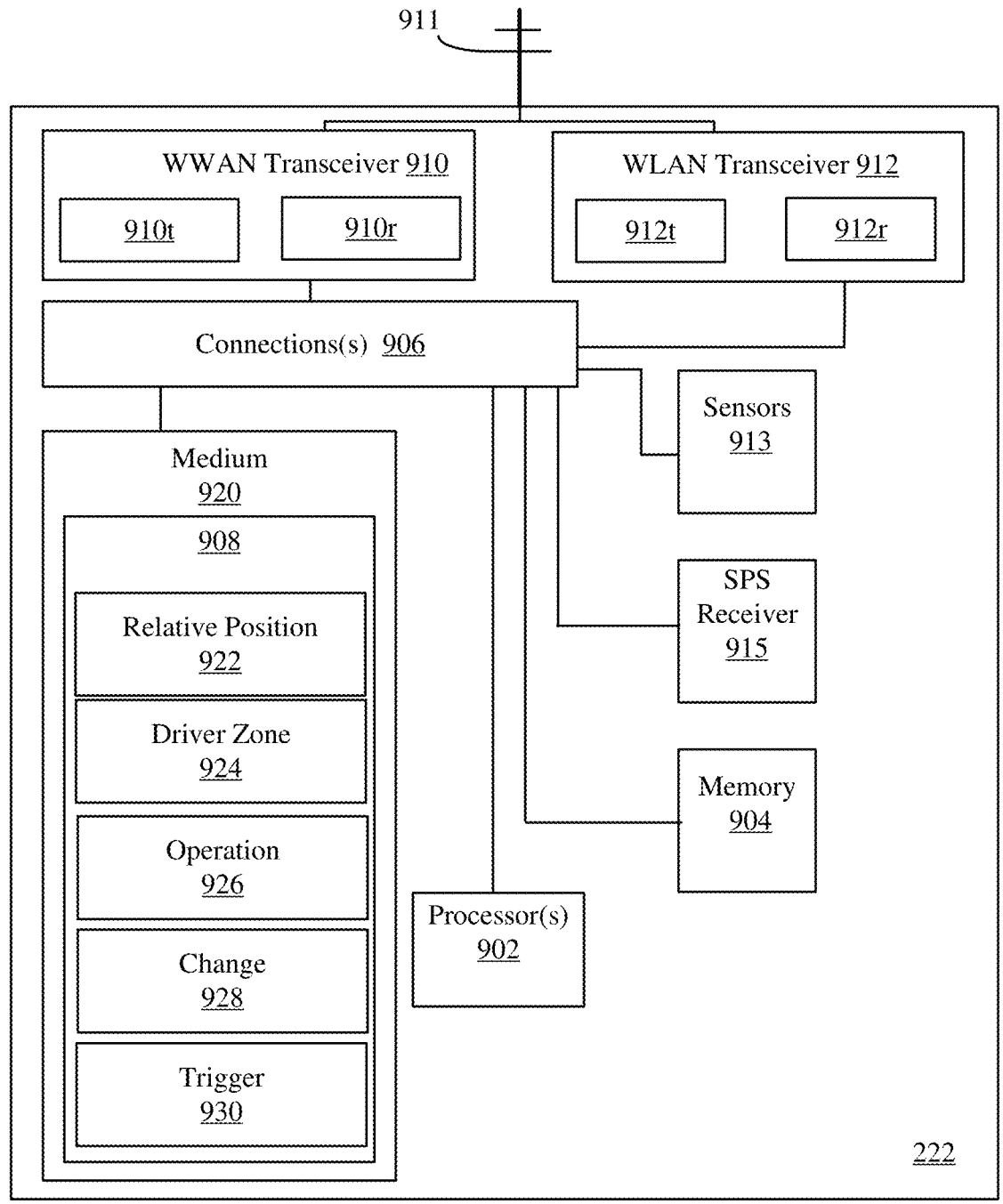
FIG. 9 shows a schematic block diagram illustrating certain exemplary features of a UE that is configured to support relative position determination of the UE within a vehicle.

FIG. 9 shows a schematic block diagram illustrating certain exemplary features of a UE 222, e.g., which may be the UE illustrated in FIGS. 2 and 4-8 that is configured to support relative position determination of the UE within a vehicle, and in particular whether the UE is within a particular area in the vehicle, such as a personal zone or proximate to the steering wheel, as discussed herein. The UE 222, for example, may perform the signal flow 800 shown in FIG. 8 and the process flows 11 and 12 shown in FIGS. 11 and 12 and algorithms disclosed herein. The UE 222 may, for example, include one or more processors 902, memory 904, an external interface such as at least one wireless transceiver (e.g., wireless network interface) illustrated as Wireless Wide Area Network (WWAN) transceiver 910 and Wireless Local Area Network (WLAN) transceiver 912, a satellite positioning system (SPS) receiver 915, and one or more sensors 913, which may be operatively coupled with one or more connections 906 (e.g., buses, lines, fibers, links, etc.) to non-transitory computer readable medium 920 and memory 904. The wireless transceiver (e.g. WWAN transceiver 910 and/or WLAN transceiver 912) may further include transceivers for Wireless Personal Area Network (WPAN), Wireless Metropolitan Area Network (WMAN), etc. The SPS receiver 915, for example, may receive and process SPS signals from satellite vehicles, such as in a Global Navigation Satellite System (GNSS). The one or more sensors 913, for example, may include a barometer and/or an inertial measurement unit (IMU) that may include one or more accelerometers, one or more gyroscopes, a magnetometer, camera, light sensor, etc. The UE 222 may further include additional items, which are not shown, such as a user interface that may include e.g., a display, a keypad or other input device, such as virtual keypad on the display, through which a user may interface with the UE. In certain example implementations, all or part of UE 222 may take the form of a chipset, and/or the like.

The at least one wireless transceiver may be a transceiver 910 for a WWAN communication system and a transceiver 912 for a WLAN communication system, or may be a combined transceiver for both WWAN and WLAN. The WWAN transceiver 910 may include a transmitter 910t and receiver 910r coupled to one or more antennas 911 for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The WLAN transceiver 912 may include a transmitter 912t and receiver 912r coupled to one or more antennas 911 or to separate antennas, for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The transmitters 910t and 912t may include multiple transmitters that may be discrete components or combined/integrated components, and/or the receivers 910r and 912r may include multiple receivers that may be discrete components or combined/integrated components. The WWAN transceiver 910 may be configured to communicate signals (e.g., with base stations and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), etc. New Radio (NR) may use mm-wave frequencies and/or sub-6 GHz frequencies. The WLAN transceiver 912 may be configured to communicate signals (e.g., with access points and/or one or more other devices) according to a variety of radio access technologies (RATs) such as 3GPP LTE-V2X (PC5), IEEE 802.11 (including IEEE 802.11p), WiFi, WiFi Direct (WiFi-D), Bluetooth®, Zigbee etc. The WWAN transceiver 910 and/or the WLAN transceiver 912 may be configured to transmit and receive wideband signals, e.g., with wireless transceivers 212. The wireless transceivers 910 and 912 may be communicatively coupled to a transceiver interface, e.g., by optical and/or electrical connection, which may be at least partially integrated with the wireless transceivers 910 and 912.

In some embodiments, UE 222 may include antenna 911, which may be internal or external. UE antenna 911 may be used to transmit and/or receive signals processed by wireless transceivers 910 and 912. In some embodiments, UE antenna 911 may be coupled to wireless transceivers 910 and 912. In some embodiments, measurements of signals received (transmitted) by UE 222 may be performed at the point of connection of the UE antenna 911 and wireless transceivers 910 and 912. For example, the measurement point of reference for received (transmitted) RF signal measurements may be an input (output) terminal of the receiver 910r (transmitter 910t) and an output (input) terminal of the UE antenna 911. In a UE 222 with multiple UE antennas 911 or antenna arrays, the antenna connector may be viewed as a virtual point representing the aggregate output (input) of multiple UE antennas. With multiple antennas 911 or an antenna array, angular measurements of received beams may be performed, e.g., as discussed in FIG. 3, or directed beams may be transmitted, e.g., as discussed in FIG. 4. In some embodiments, UE 222 may measure received signals including signal strength and TOA measurements and the raw measurements may be processed by the one or more processors 902.

The one or more processors 902 may be implemented using a combination of hardware, firmware, and software. For example, the one or more processors 902 may be configured to perform the functions discussed herein by implementing one or more instructions or program code 908 on a non-transitory computer readable medium, such as medium 920 and/or memory 904. In some embodiments, the one or more processors 902 may represent one or more circuits configurable to perform at least a portion of a data signal computing procedure or process related to the operation of UE 222.

The medium 920 and/or memory 904 may store instructions or program code 908 that contain executable code or software instructions that when executed by the one or more processors 902 cause the one or more processors 902 to operate as a special purpose computer programmed to perform the techniques disclosed herein. As illustrated in UE 222, the medium 920 and/or memory 904 may include one or more components or modules that may be implemented by the one or more processors 902 to perform the methodologies described herein. While the components or modules are illustrated as software in medium 920 that is executable by the one or more processors 902, it should be understood that the components or modules may be stored in memory 904 or may be dedicated hardware either in the one or more processors 902 or off the processors.

A number of software modules and data tables may reside in the medium 920 and/or memory 904 and be utilized by the one or more processors 902 in order to manage both communications and the functionality described herein. It should be appreciated that the organization of the contents of the medium 920 and/or memory 904 as shown in UE 222 is merely exemplary, and as such the functionality of the modules and/or data structures may be combined, separated, and/or be structured in different ways depending upon the implementation of the UE 222.

The medium 920 and/or memory 904 may include a relative position module 922 that when implemented by the one or more processors 902 configures the one or more processors 902 to determine a relative position of the UE 222 with respect to multiple wireless transceivers in the vehicle based at least on angle of arrival (AOA) of wideband signals received via at least one of the transceivers 910 and 912. The one or more processors 902 may be configured to determine if it is located inside the personal zone in the vehicle based on the relative position of the UE with respect to the multiple wireless transceivers. Additionally or alternatively, the one or more processors 902 may be configured to determine a relative position of the UE 222 with respect to one or more wireless transceivers in the vehicle based on RTT ranging using the wideband signals. For example, the one or more processors 902 may be configured to determine a relative position of the UE worn by the driver of the vehicle with respect to one or more wireless transceivers in the wireless network, which may be coupled to the vehicle, based at least on RTT and AOA of wideband signals, and to determines if the UE is located within a threshold distance to the steering wheel based on the relative position of the UE with respect to the one or more wireless transceivers and the known position of the one or more wireless transceivers relative to the steering wheel.

The medium 920 and/or memory 904 may include a personal zone module 924 that when implemented by the one or more processors 902 configures the one or more processors 902 to determine the personal zone in the vehicle based on the relative position of the UE with respect to the multiple wireless transceivers and/or the determine a threshold distance to the steering wheel based on known positions of the one or more wireless transceivers relative to the steering wheel. For example, the one or more processors 902 may be configured to receive personal zone position information and/or steering wheel position information and the relative positions of the wireless transceivers from a server, via at least one of the transceivers 910 and 912, e.g., in assistance data, which may be transmitted with the wideband signals.

The medium 920 and/or memory 904 may include an operation module 926 that when implemented by the one or more processors 902 configures the one or more processors 902 to determine whether to permit at least one functionality of the UE based on whether the UE is determined to be located in the personal zone of the driver of the vehicle. For example, the one or more processors 902 may be configured to restrict at least one functionality of the UE if the UE is determined to be located in the personal zone in the vehicle or permit the operation of the UE if the UE is determined to be not located in the personal zone in the vehicle. The at least one functionality of the UE, for example, may be restricted by locking the UE; placing the UE in sleep mode;

turning off a display of the UE; disabling touchscreen controls of the UE; pausing an application on the UE; turning off the application on the UE; converting an active call to a speaker mode, etc. The one or more processors 902 to may be configured to determine whether to restrict autonomous operation of the vehicle if the UE is determined to be outside the threshold distance to the steering wheel. For example, the one or more processors 902 may be configured to enable or restrict or permit driver assistance operations of the vehicle based on the relative position of the UE with respect to a personal zone or a threshold distance to the steering wheel, e.g., by transmitting, via at least one of the transceivers 910 and 912, a message indicating that driver assistance operations should be adjusted accordingly or not transmitting the message if no adjustment is required. For example, enabling driver assistance operations of the vehicle may include at least one of: sounding a warning; automatically engaging one or more advanced driver-assistance systems (ADAS) comprising at least one of adaptive cruise control, lane departure warning, forward collision warning, traffic signal recognition; and automatically engaging autonomous driving.

The medium 920 and/or memory 904 may include a change module 928 that that when implemented by the one or more processors 902 configures the one or more processors 902 to detect a change in position or a change in state of the UE, e.g., based on input from sensors 913. For example, the one or more processors 902 may be configured to determine an orientation of the UE within the vehicle, and may restrict the at least one functionality of the UE if the UE is determined to be located in the personal zone in the vehicle further based on the orientation of UE.

The medium 920 and/or memory 904 may include a trigger module 930 that when implemented by the one or more processors 902 configures the one or more processors 902 to trigger, for a predetermined period of time in response to detecting the change in position or the change in state of the UE, a determination of the relative position of the UE with respect to the multiple wireless transceivers in the wireless network, which may be coupled to the vehicle, and a determination if the UE is located in the personal zone in the vehicle.

The methodologies described herein may be implemented by various means depending upon the application. For example, these methodologies may be implemented in hardware, firmware, software, or any combination thereof. For a hardware implementation, the one or more processors 902 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 920 or memory 904 that is connected to and executed by the one or more processors 902. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 908 on a non-transitory computer readable medium, such as medium 920 and/or memory 904. Examples include computer readable media encoded with a data structure and computer readable media encoded with a computer program code 908. For example, the non-transitory computer readable medium including program code 908 stored thereon may include program code 908 to support relative position determination of the UE within a vehicle in a manner consistent with disclosed embodiments. Non-transitory computer readable medium 920 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 908 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 920, instructions and/or data may be provided as signals on transmission media included in a communication apparatus. For example, a communication apparatus may include a wireless transceiver 910 having signals indicative of instructions and data. The instructions and data are configured to cause one or more processors to implement the functions outlined in the claims. That is, the communication apparatus includes transmission media with signals indicative of information to perform disclosed functions.

Memory 904 may represent any data storage mechanism. Memory 904 may include, for example, a primary memory and/or a secondary memory. Primary memory may include, for example, a random access memory, read only memory, etc. While illustrated in this example as being separate from one or more processors 902, it should be understood that all or part of a primary memory may be provided within or otherwise co-located/coupled with the one or more processors 902. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 920. As such, in certain example implementations, the methods and/or apparatuses presented herein may take the form in whole or part of a computer readable medium 920 that may include computer implementable program code 908 stored thereon, which if executed by one or more processors 902 may be operatively enabled to perform all or portions of the example operations as described herein. Computer readable medium 920 may be a part of memory 904.

Figure 10:
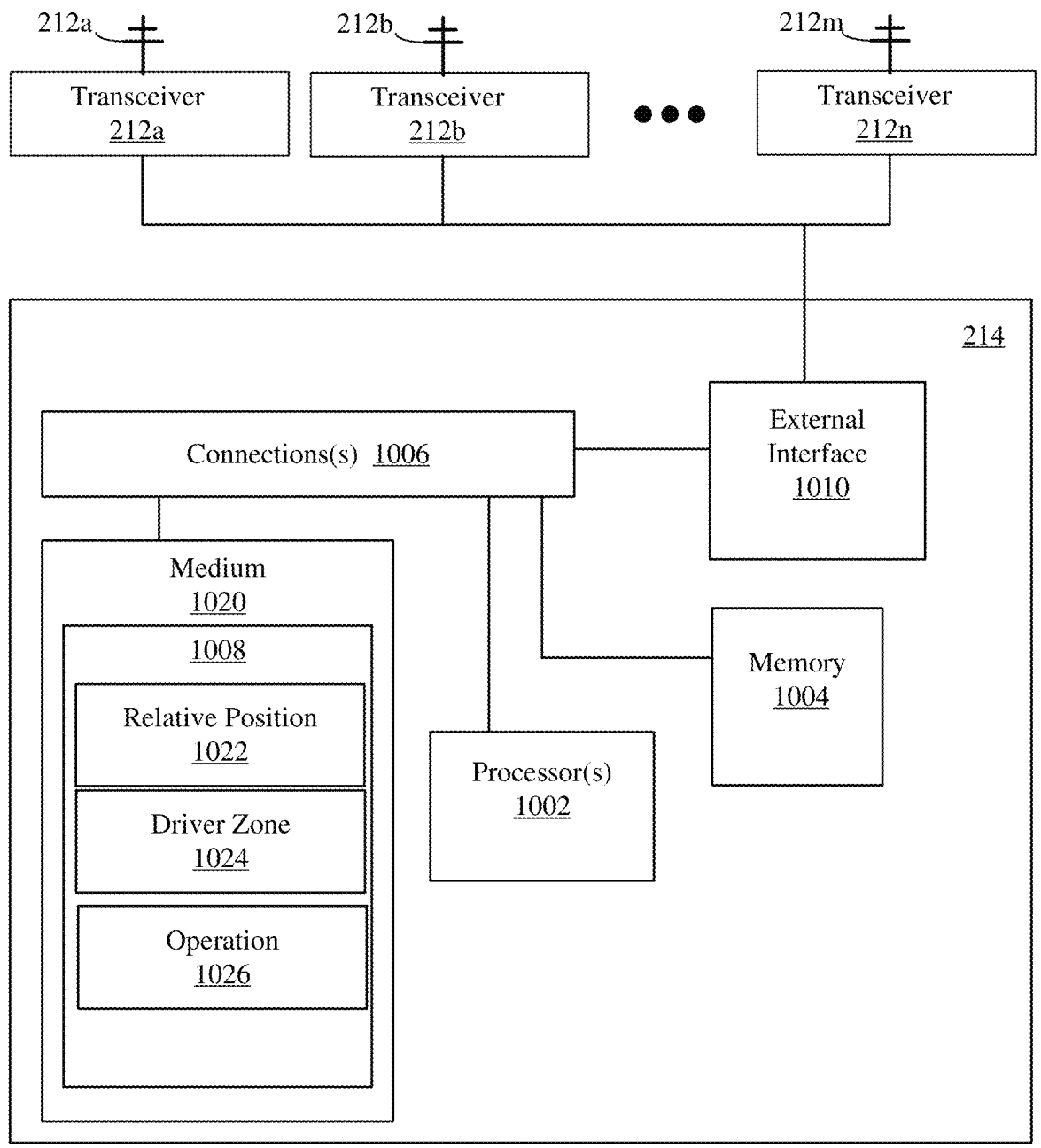
FIG. 10 shows a schematic block diagram illustrating certain exemplary features of a server that is configured to support relative position determination of the UE within a vehicle.

FIG. 10 shows a schematic block diagram illustrating certain exemplary features of server 214 coupled to at least one wireless transceiver 212 (FIG. 10 illustrates a number of transceivers with wireless transceivers 212*a*, 212*b*, . . .

212*n*), e.g., which may be the server and wireless transceivers illustrated in FIGS. 2-8 that are configured to support relative position determination of a UE within a vehicle, and in particular whether the UE is within a particular area in the vehicle, such as a personal zone or proximate to the steering wheel, as discussed herein. The server 214 may, for example, include one or more processors 1002, memory 1004, an external interface 1010 (e.g., wireline or wireless network interface to transceivers 1060 and wireless transceivers 212 and/or other entities in a wireless network, as well as a vehicle interface through which commands are provided to the vehicle for automated driving and sensory input may be provided from the vehicle), which may be operatively coupled with one or more connections 1006 (e.g., buses, lines, fibers, links, etc.) to non-transitory computer readable medium 1020 and memory 1004. In certain example implementations, all or part of server 214 may take the form of a chipset, and/or the like. The one or more processors 1002 in the server 214 may be implemented using a combination of hardware, firmware, and software. For example, the one or more processors 1002 may be configured to perform the functions discussed herein by implementing one or more instructions or program code 1008 on a non-transitory computer readable medium, such as medium 1020 and/or memory 1004. In some embodiments, the one or more processors 1002 may represent one or more circuits configurable to perform at least a portion of a data signal computing procedure or process related to the operation of server 214.

As illustrated in FIG. 10, the server 214 is coupled to one or more wireless transceivers, e.g., transceivers 212*a*, 212*b*, . . . , 212*n*, with respective antennas 213*a*, 213*b*, . . . , 213*n*, (collectively referred to as wireless transceivers 212 and antennas 213). The wireless transceivers 212 may be, e.g., WWAN transceivers or WLAN transceivers. The wireless transceivers 212 may each include a transmitter and/or receiver coupled to one or more wireless transceivers 212 for transmitting (e.g., on one or more downlink channels) to a UE and/or receiving (e.g., on one or more uplink channels) wireless signals from a UE and transducing signals from the wireless signals to wired (e.g., electrical and/or optical) signals and from wired (e.g., electrical and/or optical) signals to the wireless signals. The wireless transceivers 212 may be configured to communicate signals (e.g., with UEs in the vehicle, and optionally with base stations and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), etc. New Radio (NR) may use mm-wave frequencies and/or sub-6 GHz frequencies. The wireless transceivers 212 may additionally or alternatively be configured to communicate signals (e.g., with UEs in the vehicle and optionally with access points and/or one or more other devices) according to a variety of radio access technologies (RATs) such as 3GPP LTE-V2X (PC5), IEEE 802.11 (including IEEE 802.11p), WiFi, WiFi Direct (WiFi-D), Bluetooth®, Zigbee etc. The wireless transceivers 212 may be configured to transmit and receive wideband signals, e.g., via antennas 213. The wireless wireless transceivers 212 may be communicatively coupled to a transceiver interface, e.g., by optical and/or electrical connection, which may be at least partially integrated with the wireless wireless transceivers 212.

The antennas 212 may be internal or external to wireless transceivers 212 and are arranged in various positions in the vehicle. Antennas 212 may be used to transmit and/or receive signals processed by wireless wireless transceivers 212. In some embodiments, measurements of signals received (transmitted) by wireless transceivers 212 may be performed at the point of connection of the antennas 213 and wireless wireless transceivers 212. For example, the measurement point of reference for received (transmitted) RF signal measurements may be an input (output) terminal of the receiver (transmitter) and an output (input) terminal of the antennas 213. It should be understood that each illustrated antenna 212 may include a subset of multiple antennas or an antenna array, e.g., as illustrated in FIG. 3, and the antenna connector may be viewed as a virtual point representing the aggregate output (input) of multiple antennas. With multiple antennas or an antenna array, angular measurements of received beams may be performed, e.g., as discussed in FIG. 3, or directed beams may be transmitted, e.g., as discussed in FIG. 4. In some embodiments, wireless transceivers 212 may measure received signals including signal strength and TOA measurements and the raw measurements may be processed by the one or more processors 1002 in the server 214.

The medium 1020 and/or memory 1004 may store instructions or program code 1008 that contain executable code or software instructions that when executed by the one or more processors 1002 cause the one or more processors 1002 to operate as a special purpose computer programmed to perform the techniques disclosed herein. As illustrated in server 214, the medium 1020 and/or memory 1004 may include one or more components or modules that may be implemented by the one or more processors 1002 to perform the methodologies described herein. While the components or modules are illustrated as software in medium 1020 that is executable by the one or more processors 1002, it should be understood that the components or modules may be stored in memory 1004 or may be dedicated hardware either in the one or more processors 1002 or off the processors.

A number of software modules and data tables may reside in the medium 1020 and/or memory 1004 and be utilized by the one or more processors 1002 in order to manage both communications and the functionality described herein. It should be appreciated that the organization of the contents of the medium 1020 and/or memory 1004 as shown in server 214 is merely exemplary, and as such the functionality of the modules and/or data structures may be combined, separated, and/or be structured in different ways depending upon the implementation of the server 214.

The medium 1020 and/or memory 1004 may include a relative position module 1022 that when implemented by the one or more processors 1002 configures the one or more processors 1002 to determine a relative position of the UE 222 with respect to multiple wireless transceivers 212 in the vehicle based at least on angle of arrival (AOA) of wideband signals received via the wireless transceivers 212. The one or more processors 1002 may be configured to determine if the UE 222 is located inside the personal zone in the vehicle based on the relative position of the UE with respect to the multiple wireless transceivers. Additionally or alternatively, the one or more processors 1002 may be configured to determine a relative position of the UE 222 with respect to one or more wireless transceivers in the vehicle based on RTT ranging using the wideband signals. For example, the one or more processors 1002 may be configured to determine a relative position of the UE worn by the driver of the vehicle with respect to one or more wireless transceivers in the wireless network, which may be coupled to the vehicle, based at least on RTT and AOA of wideband signals, and to determines if the UE is located within a threshold distance to the steering wheel based on the relative position of the UE with respect to the one or more wireless transceivers and the known position of the one or more wireless transceivers relative to the steering wheel.

The medium 1020 and/or memory 1004 may include a personal zone module 1024 that when implemented by the one or more processors 1002 configures the one or more processors 1002 to determine the personal zone in the vehicle based on the relative position of the UE with respect to the multiple wireless transceivers and/or the determine a threshold distance to the steering wheel based on known positions of the one or more wireless transceivers relative to the steering wheel. For example, the one or more processors 902 may be configured to configure the personal zone and/or steering wheel position threshold based on vehicle information, such as vehicle type or make and model. The one or more processors 902 may be configured to receive driver seat position data via the external interface 1010 and dynamically adjust the personal zone accordingly. The one or more processors 902 may be configured to provide position information and/or steering wheel position information and the relative positions of the wireless transceivers 212 to a UE 222, via the external interface 1010, e.g., using one or more of the wireless transceivers 212, e.g., in assistance data, which may be transmitted with the wideband signals.

The medium 1020 and/or memory 1004 may include an operation module 1026 that when implemented by the one or more processors 1002 configures the one or more processors 1002 to determine whether to permit at least one functionality of the UE based on whether the UE is determined to be located in the personal zone of the driver of the vehicle. For example, the one or more processors 1002 may be configured to restrict at least one functionality of the UE if the UE is determined to be located in the personal zone in the vehicle or permit the operation of the UE if the UE is determined to be not located in the personal zone in the vehicle. The one or more processors 1002, for example, may be configured to send, via the external interface 1010 and at least one of the wireless transceivers 212, a message indicating that operation of the UE should be restricted or to not send the message if no adjustment is required. The at least one functionality of the UE, for example, may be restricted by locking the UE; placing the UE in sleep mode; turning off a display of the UE; disabling touchscreen controls of the UE; pausing an application on the UE; turning off the application on the UE; converting an active call to a speaker mode, etc. The one or more processors 1002 to may be configured to determine whether to restrict autonomous operation of the vehicle if the UE is determined to be outside the threshold distance to the steering wheel. For example, the one or more processors 902 may be configured to enable or restrict or permit driver assistance operations of the vehicle based on the relative position of the UE with respect to a personal zone or a threshold distance to the steering wheel. For example, enabling driver assistance operations of the vehicle may include at least one of: sounding a warning; automatically engaging one or more advanced driver-assistance systems (ADAS) comprising at least one of adaptive cruise control, lane departure warning, forward collision warning, traffic signal recognition; and automatically engaging autonomous driving.

The methodologies described herein may be implemented by various means depending upon the application. For example, these methodologies may be implemented in hardware, firmware, software, or any combination thereof. For a hardware implementation, the one or more processors 1002 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

The methodologies described herein may be implemented by various means depending upon the application. For example, these methodologies may be implemented in hardware, firmware, software, or any combination thereof. For a hardware implementation, the one or more processors 1002 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1020 or memory 1004 that is connected to and executed by the one or more processors 1002. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1008 on a non-transitory computer readable medium, such as medium 1020 and/or memory 1004. Examples include computer readable media encoded with a data structure and computer readable media encoded with a computer program code 1008. For example, the non-transitory computer readable medium including program code 1008 stored thereon may include program code 1008 to support relative position determination of the UE within a vehicle in a manner consistent with disclosed embodiments. Non-transitory computer readable medium 1020 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1008 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1020, instructions and/or data may be provided as signals on transmission media included in a communication apparatus. For example, a communication apparatus may include an external interface 1010 having signals indicative of instructions and data. The instructions and data are configured to cause one or more processors to implement the functions outlined in the claims. That is, the communication apparatus includes transmission media with signals indicative of information to perform disclosed functions.

Memory 1004 may represent any data storage mechanism. Memory 1004 may include, for example, a primary memory and/or a secondary memory. Primary memory may include, for example, a random access memory, read only memory, etc. While illustrated in this example as being separate from one or more processors 1002, it should be understood that all or part of a primary memory may be provided within or otherwise co-located/coupled with the one or more processors 1002. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1020. As such, in certain example implementations, the methods and/or apparatuses presented herein may take the form in whole or part of a computer readable medium 1020 that may include computer implementable program code 1008 stored thereon, which if executed by one or more processors 1002 may be operatively enabled to perform all or portions of the example operations as described herein. Computer readable medium 1020 may be a part of memory 1004.

Figure 11:
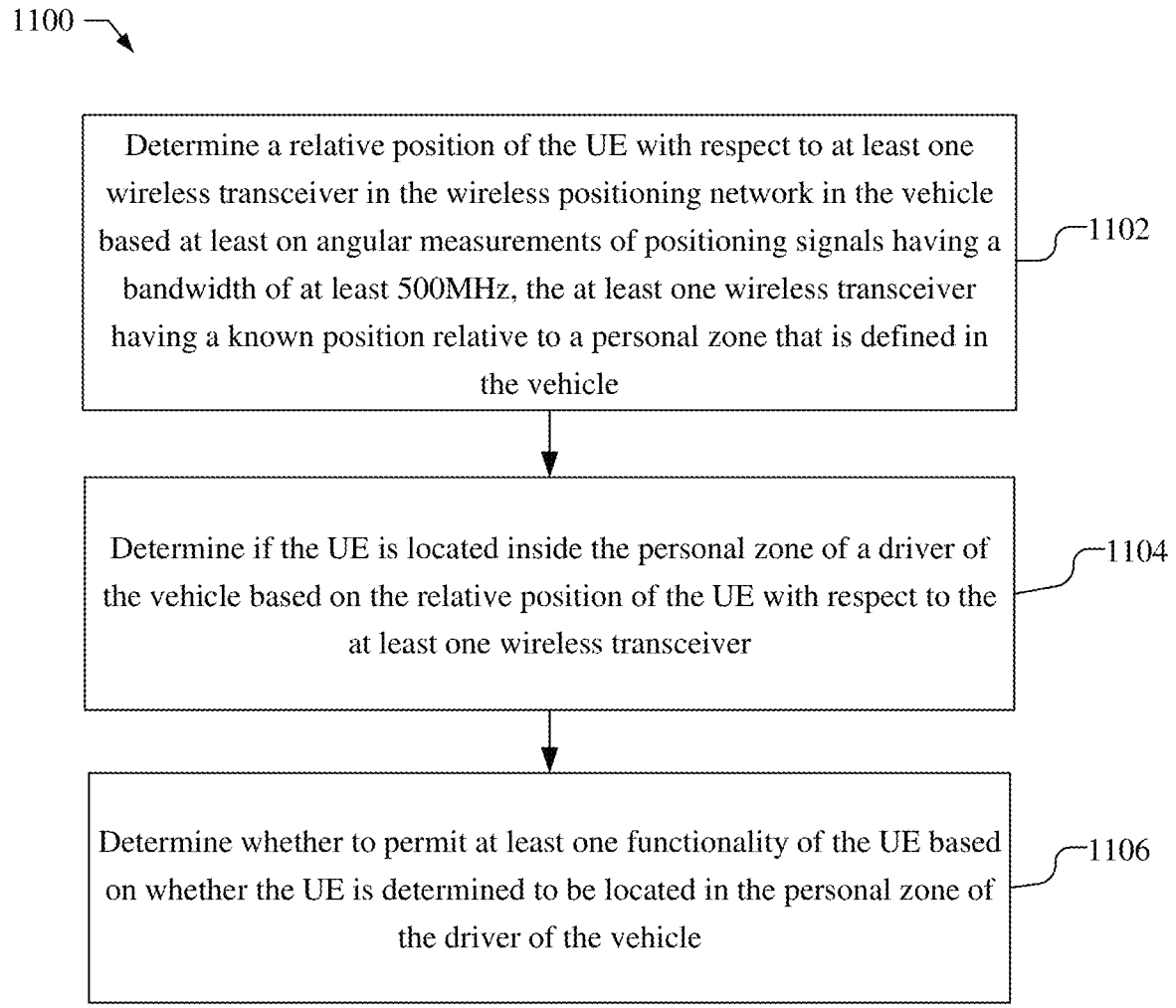
FIG. 11 is a flow chart illustrating a process of relative positioning a UE within the vehicle performed by a positioning entity in a wireless network in a vehicle.

FIG. 11 is a flow chart 1100 illustrating a process of relative positioning a UE within the vehicle performed by a positioning entity in a wireless network in a vehicle. The positioning entity, for example, may be the server 214 illustrated in FIGS. 2, 8, and 10, or the UE 222 illustrated in FIGS. 2, 4-9.

At block 1102, the positioning entity determines a relative position of the UE with respect to at least one wireless transceiver in the wireless network based at least on angular measurements of signals having a bandwidth of at least 500 MHz, the at least one wireless transceiver having a known position relative to a personal zone that is defined in the vehicle, e.g., as illustrated in FIGS. 2-7, and discussed in stages 6A, 6B, 7A, 7B, 8A, and 8B of FIG. 8. In some implementations, the wireless transceivers may be coupled to the vehicle. The angular measurements, for example, may include at least one of angle of arrival (AOA) measurements, angle of departure (AOD) measurements, or a combination thereof. A means for determining a relative position of the UE with respect to at least one wireless transceiver in the wireless network based at least on angle of arrival (AOA) of signals having a bandwidth of at least 500 MHz, the at least one wireless transceiver having a known position relative to a personal zone that is defined in the vehicle may be, e.g., the wireless transceiver 910 and one or more processors 902 with dedicated hardware or implementing executable code or software instructions 908 in computer readable medium 920 and/or memory 904 such as the relative position module 922 in the UE 222 shown in FIG. 9 or the external interface 1010 and one or more processors 1002 with dedicated hardware or implementing executable code or software instructions 1008 in computer readable medium 1020 and/or memory 1004 such as the relative position module 1022 in the server 214 shown in FIG. 10.

In some implementations, instead of performing block 1102, the positioning entity may determine a relative position of the UE with respect to at least one wireless transceiver in the wireless network based at least on angular measurements of signals, wherein each of the wireless transceivers comprises multiple receive antennas for performing the angular measurements of the signals and the at least one wireless transceiver having a known position relative to a personal zone that is defined in the vehicle, e.g., as illustrated in FIGS. 2-7, and discussed in stages 6A, 6B, 7A, 7B, 8A, and 8B of FIG. 8. The angular measurements, for example, may include at least one of angle of arrival (AOA) measurements, angle of departure (AOD) measurements, or a combination thereof. A means for determining a relative position of the UE with respect to at least one wireless transceiver in the wireless network based at least on angle of arrival (AOA) of signals, wherein each of the wireless transceivers comprises multiple receive antennas for performing the angular measurements of the signals and the at least one wireless transceiver having a known position relative to a personal zone that is defined in the vehicle may be, e.g., the wireless transceiver 910 and one or more processors 902 with dedicated hardware or implementing executable code or software instructions 908 in computer readable medium 920 and/or memory 904 such as the relative position module 922 in the UE 222 shown in FIG. 9 or the external interface 1010 and one or more processors 1002 with dedicated hardware or implementing executable code or software instructions 1008 in computer readable medium 1020 and/or memory 1004 such as the relative position module 1022 in the server 214 shown in FIG. 10.

At block 1104, the positioning entity may determine if the UE is located inside the personal zone of a driver of the vehicle based on the relative position of the UE with respect to the at least one wireless transceiver, e.g., as illustrated in FIGS. 2 and 6 and discussed in stages 8A and 8B of FIG. 8. A means for determining if the UE is located inside the personal zone of a driver of the vehicle based on the relative position of the UE with respect to the at least one wireless transceiver may be, e.g., the wireless transceiver 910 and one or more processors 902 with dedicated hardware or implementing executable code or software instructions 908 in computer readable medium 920 and/or memory 904 such as the relative position module 922 and the personal zone module 924 in the UE 222 shown in FIG. 9 or the external interface 1010 and one or more processors 1002 with dedicated hardware or implementing executable code or software instructions 1008 in computer readable medium 1020 and/or memory 1004 such as the relative position module 1022 and the personal zone module 1024 in the server 214 shown in FIG. 10.

At block 1106, the positioning entity may determine whether to permit at least one functionality of the UE based on whether the UE is determined to be located in the personal zone of the driver of the vehicle, e.g., as discussed in FIG. 6 and stages 9A and 10 of FIG. 8. A means for determine whether to permit at least one functionality of the UE based on whether the UE is determined to be located in the personal zone of the driver of the vehicle may be, e.g., the wireless transceiver 910 and one or more processors 902 with dedicated hardware or implementing executable code or software instructions 908 in computer readable medium 920 and/or memory 904 such as the operation module 926 in the UE 222 shown in FIG. 9 or the external interface 1010 and one or more processors 1002 with dedicated hardware or implementing executable code or software instructions 1008 in computer readable medium 1020 and/or memory 1004 such as the operation module 1026 in the server 214 shown in FIG. 10.

In one implementation, the positioning entity may restrict at least one functionality of the UE if the UE is determined to be located in the personal zone of the driver of the vehicle, e.g., as discussed in FIG. 6 and stages 9A and 10 of FIG. 8. A means for restricting at least one functionality of the UE if the UE is determined to be located in the personal zone of the driver of the vehicle may be, e.g., the wireless transceiver 910 and one or more processors 902 with dedicated hardware or implementing executable code or software instructions 908 in computer readable medium 920 and/or memory 904 such as the operation module 926 in the UE 222 shown in FIG. 9 or the external interface 1010 and one or more processors 1002 with dedicated hardware or implementing executable code or software instructions 1008 in computer readable medium 1020 and/or memory 1004 such as the operation module 1026 in the server 214 shown in FIG. 10.

In one implementation, the positioning entity may permit operation of the UE if the UE is determined to be not located in the personal zone of the driver of the vehicle, e.g., as discussed in FIG. 6 and stages 9A and 10 of FIG. 8. A means for permitting operation of the UE if the UE is determined to be not located in the personal zone of the driver of the vehicle may be, e.g., the one or more processors 902 with dedicated hardware or implementing executable code or software instructions 908 in computer readable medium 920 and/or memory 904 such as the operation module 926 in the UE 222 shown in FIG. 9 or the external interface 1010 and one or more processors 1002 with dedicated hardware or implementing executable code or software instructions 1008 in computer readable medium 1020 and/or memory 1004 such as the operation module 1026 in the server 214 shown in FIG. 10.

In one implementation, the wireless transceivers may include multiple receive antennas for performing the angular measurements of the signals, e.g., discussed in stages 4A and 4B of FIG. 8. In one implementation, each of the wireless transceivers may include a single receive antenna and the UE comprises multiple receive antennas for performing the angular measurements of the signals, e.g., discussed in stages 4A and 4B of FIG. 8.

In one implementation, the positioning entity may be a server in the wireless network in the vehicle, and the server may restrict the at least one functionality of the UE by sending a message to the UE to restrict the operation of the UE and may permit the operation of the UE by not sending the message to the UE to restrict the at least one functionality, e.g., as discussed in FIG. 6 and stage 9A of FIG. 8. In one example, the message sent to the UE to restrict the at least one functionality of the UE is sent via one or more of the wireless transceivers, e.g., as discussed at stage 9A of FIG. 8. In one example, the message sent to the UE to restrict the at least one functionality of the UE is sent via a wired connection between the UE and the server, e.g., as discussed at stage 9A of FIG. 8. A means for sending a message to the UE to restrict the at least one functionality of the UE and a means for not sending the message to the UE to restrict the operation may be the external interface 1010 and one or more processors 1002 with dedicated hardware or implementing executable code or software instructions 1008 in computer readable medium 1020 and/or memory 1004 such as the operation module 1026 in the server 214 shown in FIG. 10.

In one implementation, the positioning entity may be the UE, and assistance data is provided to the UE by a server in the wireless network in the vehicle, the assistance data comprising information related to the known positions of the at least one wireless transceiver relative to the personal zone, e.g., as discussed at stage 1 of FIG. 8. In one example, the assistance data may be sent with via one or more of the wireless transceivers, e.g., as discussed at stage 1 of FIG. 8. In one example, the assistance data may be sent to the UE via a wired connection between the UE and the server, e.g., as discussed at stage 9A of FIG. 8.

In one implementation, the signals are transmitted by the UE and received by the at least one wireless transceiver in the wireless network, e.g., as illustrated in FIG. 2 and stage 4A of FIG. 8.

In one implementation, the signals are transmitted by the at least one wireless transceiver in the wireless network and received by the UE, e.g., as illustrated in FIG. 2 and stage 4B of FIG. 8.

In one implementation, the positioning entity may determine the relative position of the UE with respect to the at least one wireless transceiver in the wireless network further based on round trip time (RTT) ranging between the UE and the at least one wireless transceiver, e.g., as illustrated in FIGS. 5-7, and stages 6A and 6B of FIG. 8.

In one implementation, the personal zone may be defined in the vehicle based on calibration for vehicle type, e.g., as illustrated in FIG. 2 and discussed in stage 1 of FIG. 8.

In one implementation, the personal zone may be dynamically adjusted based on a driver seat position, e.g., as illustrated in FIG. 2 and discussed in stage 1 of FIG. 8.

In one implementation, the positioning entity may detect a change in position or a change in state of the UE, e.g., as discussed in reference to FIG. 6 and at stage 12 of FIG. 8, and may trigger, for a predetermined period of time in response to detecting the change in position or the change in state of the UE, a determination of the relative position of the UE with respect to the at least one wireless transceiver in the wireless network and a determination if the UE is located in the personal zone in the vehicle, e.g., as discussed in reference to FIG. 6 and at stage 12 of FIG. 8. A means for detecting a change in position or a change in state of the UE may be, e.g., the sensors 913 and one or more processors 902 with dedicated hardware or implementing executable code or software instructions 908 in computer readable medium 920 and/or memory 904 such as the change module 928 in the UE 222 shown in FIG. 9. A means for triggering, for a predetermined period of time in response to detecting the change in position or the change in state of the UE, a determination of the relative position of the UE with respect to the at least one wireless transceiver in the wireless network and a determination if the UE is located in the personal zone in the vehicle, may be, e.g., the wireless transceiver 910 and one or more processors 902 with dedicated hardware or implementing executable code or software instructions 908 in computer readable medium 920 and/or memory 904 such as the trigger module 930 in the UE 222 shown in FIG. 9.

In one implementation, the positioning entity may determine an orientation of the UE within the vehicle, and may restrict the at least one functionality of the UE if the UE is determined to be located in the personal zone in the vehicle further based on the orientation of the UE, e.g., as discussed at FIG. 6 and stage 8A and 8B of FIG. 8. A means for determining an orientation of the UE within the vehicle may be, e.g., may be, e.g., the sensors 913 and one or more processors 902 with dedicated hardware or implementing executable code or software instructions 908 in computer readable medium 920 and/or memory 904 such as the change module 928 in the UE 222 shown in FIG. 9.

In one implementation, restricting the at least one functionality of the UE if the UE is determined to be located in the personal zone in the vehicle may include at least one of: locking the UE; placing the UE in sleep mode; turning off a display of the UE; disabling touchscreen controls of the UE; pausing an application on the UE; turning off the application on the UE; converting an active call to a speaker mode, or any combination thereof, e.g., as discussed in FIG. 6 and at stages 9A and 10 of FIG. 8.

In one implementation, the positioning entity enable driver assistance operations of the vehicle if the UE is determined to be located in the personal zone in the vehicle, e.g., as discussed in FIG. 6 and stages 9B and 11 of FIG. 8. A means for enabling driver assistance operations of the vehicle if the UE is determined to be located in the personal zone in the vehicle may be, e.g., the wireless transceiver 910 and the one or more processors 902 with dedicated hardware or implementing executable code or software instructions 908 in computer readable medium 920 and/or memory 904 such as the operation module 926 in the UE 222 shown in FIG. 9 or the external interface 1010 and one or more processors 1002 with dedicated hardware or implementing executable code or software instructions 1008 in computer readable medium 1020 and/or memory 1004 such as the operation module 1026 in the server 214 shown in FIG. 10. For example, enabling driver assistance operations of the vehicle comprises at least one of: sounding a warning; automatically engaging one or more advanced driver-assistance systems (ADAS) comprising at least one of adaptive cruise control, lane departure warning, forward collision warning, traffic signal recognition; automatically engaging autonomous driving, or any combination thereof, e.g., as discussed in FIG. 6 and at stages 9B and 11 of FIG. 8.

Figure 12:
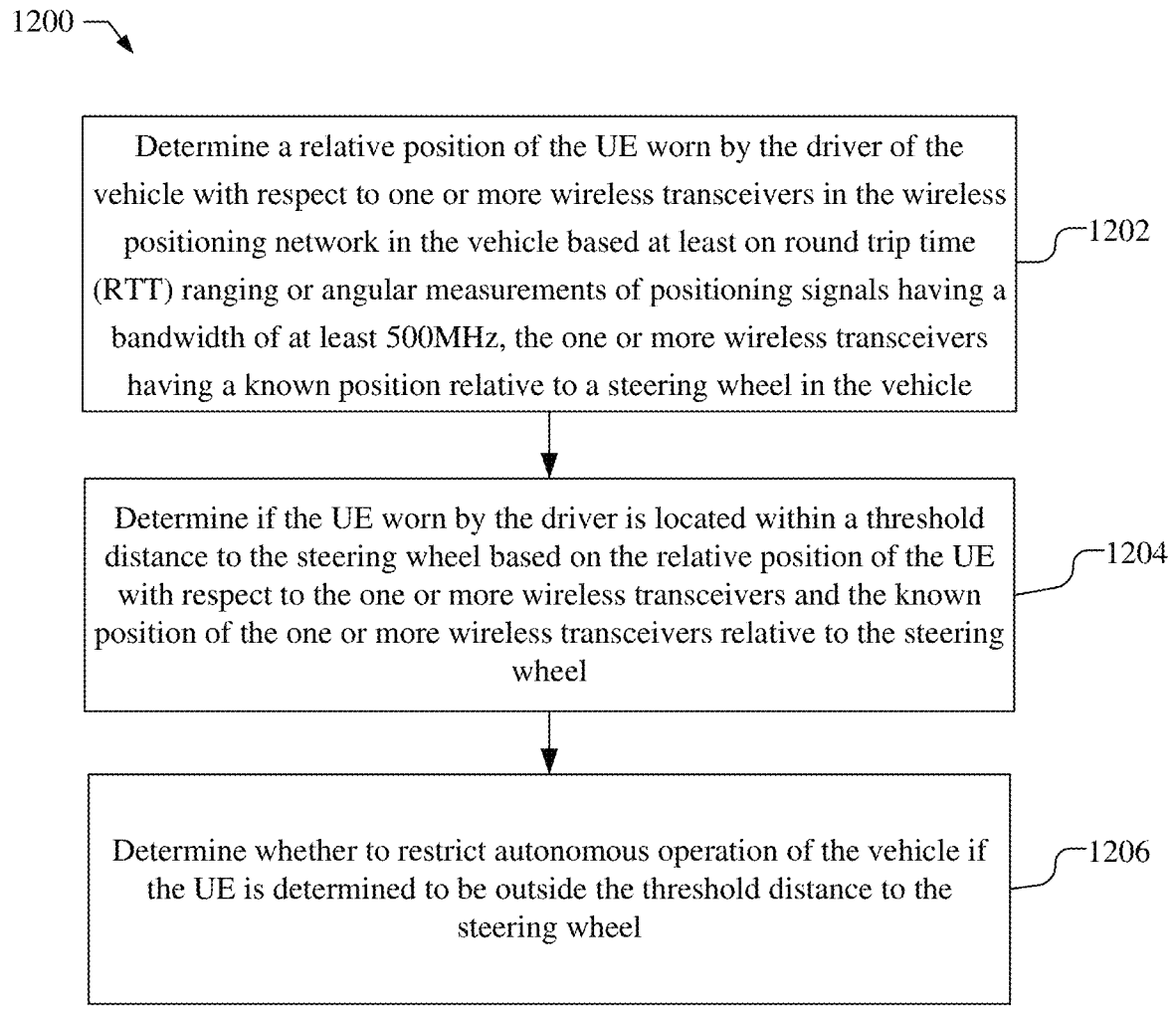
FIG. 12 is a flow chart illustrating a process of relative positioning a UE within the vehicle performed by a positioning entity in a wireless network in a vehicle.

FIG. 12 is a flow chart 1200 illustrating a process of relative positioning a UE worn by a driver of a vehicle performed by a positioning entity in a wireless network in the vehicle. The positioning entity, for example, may be the server 214 illustrated in FIGS. 2, 8, and 10, or the UE 222 illustrated in FIGS. 2, 4-9.

At block 1202, the positioning entity determines a relative position of the UE worn by the driver of the vehicle with respect to one or more wireless transceivers in the wireless network based at least on round trip time (RTT) ranging or angular measurements of signals having a bandwidth of at least 500 MHz, the one or more wireless transceivers having a known position relative to a steering wheel in the vehicle, e.g., as illustrated in FIGS. 2-7, and discussed in stages 6A, 6B, 7A, 7B, 8A, and 8B of FIG. 8. In some implementations, the one or more wireless transceivers may be coupled to the vehicle. The angular measurements, for example, may include at least one of angle of arrival (AOA) measurements, angle of departure (AOD) measurements, or a combination thereof. A means for determining a relative position of the UE worn by the driver of the vehicle with respect to one or more wireless transceivers in the wireless network based at least on round trip time (RTT) ranging or angle of arrival (AOA) of signals having a bandwidth of at least 500 MHz, the one or more wireless transceivers having a known position relative to a steering wheel in the vehicle may be, e.g., the wireless transceiver 910 and one or more processors 902 with dedicated hardware or implementing executable code or software instructions 908 in computer readable medium 920 and/or memory 904 such as the relative position module 922 in the UE 222 shown in FIG. 9 or the external interface 1010 and one or more processors 1002 with dedicated hardware or implementing executable code or software instructions 1008 in computer readable medium 1020 and/or memory 1004 such as the relative position module 1022 in the server 214 shown in FIG. 10.

In one implementation, instead of performing block 1202, the positioning entity may determine a relative position of the UE worn by the driver of the vehicle with respect to one or more wireless transceivers in the wireless network based at least on round trip time (RTT) ranging or angular measurements of signals, wherein each of the one or more wireless transceivers comprises multiple receive antennas for performing the angular measurements of the signals and the one or more wireless transceivers having a known position relative to a steering wheel in the vehicle, e.g., as illustrated in FIGS. 2-7, and discussed in stages 6A, 6B, 7A, 7B, 8A, and 8B of FIG. 8. The angular measurements, for example, may include at least one of angle of arrival (AOA) measurements, angle of departure (AOD) measurements, or a combination thereof. A means for determining a relative position of the UE worn by the driver of the vehicle with respect to one or more wireless transceivers in the wireless network based at least on round trip time (RTT) ranging or angle of arrival (AOA) of signals, wherein each of the one or more wireless transceivers comprises multiple receive antennas for performing the angular measurements of the signals and the one or more wireless transceivers having a known position relative to a steering wheel in the vehicle may be, e.g., the wireless transceiver 910 and one or more processors 902 with dedicated hardware or implementing executable code or software instructions 908 in computer readable medium 920 and/or memory 904 such as the relative position module 922 in the UE 222 shown in FIG. 9 or the external interface 1010 and one or more processors 1002 with dedicated hardware or implementing executable code or software instructions 1008 in computer readable medium 1020 and/or memory 1004 such as the relative position module 1022 in the server 214 shown in FIG. 10.

At block 1204, the positioning entity determines if the UE worn by the driver is located within a threshold distance to the steering wheel based on the relative position of the UE with respect to the one or more wireless transceivers and the known position of the one or more wireless transceivers relative to the steering wheel, e.g., as illustrated in FIG. 7 and discussed in stages 8A and 8B of FIG. 8. In some implementations, if the UE is outside the threshold distance, a determination may be made if the UE is outside the threshold distance for more than a threshold amount of time. A means for determining if the UE worn by the driver is located within a threshold distance to the steering wheel based on the relative position of the UE with respect to the one or more wireless transceivers and the known position of the one or more wireless transceivers relative to the steering wheel may be, e.g., the wireless transceiver 910 and one or more processors 902 with dedicated hardware or implementing executable code or software instructions 908 in computer readable medium 920 and/or memory 904 such as the relative position module 922 and the personal zone module 924 in the UE 222 shown in FIG. 9 or the external interface 1010 and one or more processors 1002 with dedicated hardware or implementing executable code or software instructions 1008 in computer readable medium 1020 and/or memory 1004 such as the relative position module 1022 and the personal zone module 1024 in the server 214 shown in FIG. 10.

At block 1206, the positioning entity may determine whether to restrict autonomous operation of the vehicle if the UE is determined to be outside the threshold distance to the steering wheel, e.g., as discussed in FIG. 7 and stages 9B and 11 of FIG. 8. For example, in some implementations, additional conditions may be checked to determine if the driver is focused on driving, before altering operation of the vehicle. A means for determining whether to restrict autonomous operation of the vehicle if the UE is determined to be outside the threshold distance to the steering wheel may be, e.g., the wireless transceiver 910 and one or more processors 902 with dedicated hardware or implementing executable code or software instructions 908 in computer readable medium 920 and/or memory 904 such as the operation module 926 in the UE 222 shown in FIG. 9 or the external interface 1010 and one or more processors 1002 with dedicated hardware or implementing executable code or software instructions 1008 in computer readable medium 1020 and/or memory 1004 such as the operation module 1026 in the server 214 shown in FIG. 10.

In one implementation, the positioning entity may restrict autonomous operation of the vehicle if the UE is determined to be outside the threshold distance to the steering wheel, e.g., as discussed in FIG. 7 and stages 9B and 11 of FIG. 8. A means for restricting autonomous operation of the vehicle if the UE is determined to be outside the threshold distance to the steering wheel may be, e.g., the wireless transceiver 910 and one or more processors 902 with dedicated hardware or implementing executable code or software instructions 908 in computer readable medium 920 and/or memory 904 such as the operation module 926 in the UE 222 shown in FIG. 9 or the external interface 1010 and one or more processors 1002 with dedicated hardware or implementing executable code or software instructions 1008 in computer readable medium 1020 and/or memory 1004 such as the operation module 1026 in the server 214 shown in FIG. 10.

In one implementation, the positioning entity may permit autonomous operation of the vehicle if the UE is determined to be within the threshold distance to the steering wheel vehicle, e.g., as discussed in FIG. 7 and stages 9B and 11 of FIG. 8. A means for permitting autonomous operation of the vehicle if the UE is determined to be within the threshold distance to the steering wheel may be, e.g., the one or more processors 902 with dedicated hardware or implementing executable code or software instructions 908 in computer readable medium 920 and/or memory 904 such as the operation module 926 in the UE 222 shown in FIG. 9 or the external interface 1010 and one or more processors 1002 with dedicated hardware or implementing executable code or software instructions 1008 in computer readable medium 1020 and/or memory 1004 such as the operation module 1026 in the server 214 shown in FIG. 10.

In one implementation, the UE is worn on a wrist of the driver and the threshold distance to the steering wheel provides an indication that a hand of the driver is on the steering wheel, e.g., as discussed in FIG. 7.

In one implementation, the autonomous operation of the vehicle may include at least one of one or more advanced driver-assistance systems (ADAS) that includes adaptive cruise control, lane departure warning, forward collision warning, traffic signal recognition, autonomous driving, or any combination thereof, e.g., as discussed in FIG. 7 and stages 9B and 11 of FIG. 8.

In one implementation, the positioning entity may be a server in the wireless network in the vehicle, e.g., as discussed in FIG. 7 and stages 6A, 7A, 8A, and 11 of FIG. 8.

In one implementation, the positioning entity may be the UE worn by the driver, and the UE may restrict the autonomous operation of the vehicle by sending a message to a server in the wireless network in the vehicle to restrict the autonomous operation of the vehicle and may permit the autonomous operation of the vehicle by not sending the message to the vehicle to restrict the autonomous operation, e.g., as discussed in FIG. 7 and stage 9B of FIG. 8. In one example, the message to the server is sent by the UE to the server via one or more of the wireless transceivers, e.g., as discussed at stage 9B of FIG. 8. In one example, the message to the server is sent via a wired connection between the UE and the server, e.g., as discussed at stage 9B of FIG. 8. A means for sending a message to a server in the wireless network in the vehicle to restrict the autonomous operation of the vehicle and a means for not sending the message to the vehicle to restrict the autonomous operation may be, e.g., the one or more processors 902 with dedicated hardware or implementing executable code or software instructions 908 in computer readable medium 920 and/or memory 904 such as the operation module 926 in the UE 222 shown in FIG. 9.

In one implementation, the signals are transmitted by the UE and received by the one or more wireless transceivers in the wireless network, e.g., as illustrated in FIG. 2 and stage 4A of FIG. 8.

In one implementation, the signals are transmitted by the one or more wireless transceivers in the wireless network and received by the UE, e.g., as illustrated in FIG. 2 and stage 4B of FIG. 8.

In one implementation, the at least one of the one or more wireless transceivers is mounted on the steering wheel, e.g., as illustrated in FIG. 7.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

In view of this description embodiments may include different combinations of features. Implementation examples are described in the following numbered clauses:

Clause 1. A method performed by a positioning entity in a wireless network in a vehicle for relative positioning a user equipment (UE) within the vehicle, the method comprising: determining a relative position of the UE with respect to at least one wireless transceiver in the wireless network based at least on angular measurements of signals having a bandwidth of at least 500 MHz, the at least one wireless transceiver having a known position relative to a personal zone that is defined in the vehicle; determining if the UE is located inside the personal zone of a driver of the vehicle based on the relative position of the UE with respect to the at least one wireless transceiver; and determining whether to permit at least one functionality of the UE based on whether the UE is determined to be located in the personal zone of the driver of the vehicle.

Clause 2. The method of clause 1, further comprising: restricting at least one functionality of the UE if the UE is determined to be located in the personal zone of the driver of the vehicle; and permitting operation of the UE if the UE is determined to be not located in the personal zone of the driver of the vehicle.

Clause 3. The method of clause 1, wherein each of the wireless transceivers comprises multiple receive antennas for performing the angular measurements of the signals.

Clause 4. The method of any of clauses 1-3, wherein each of the wireless transceivers comprises a single receive antenna and the UE comprises multiple receive antennas for performing the angular measurements of the signals.

Clause 5. The method of any of clauses 1-4, wherein the positioning entity is a server in the wireless network in the vehicle, wherein restricting the at least one functionality of the UE comprises sending a message to the UE to restrict the at least one functionality of the UE and wherein permitting the operation of the UE comprises not sending the message to the UE to restrict the at least one functionality.

Clause 6. The method of clause 5, wherein the message to the UE to restrict the at least one functionality of the UE is sent via one or more of the wireless transceivers.

Clause 7. The method of clause 5, wherein the message to the UE to restrict the at least one functionality of the UE is sent via a wired connection between the UE and the server.

Clause 8. The method of any of clauses 1-7, wherein the positioning entity is the UE, wherein assistance data is provided to the UE by a server in the wireless network in the vehicle, the assistance data comprising information related to the known positions of the at least one wireless transceiver relative to the personal zone.

Clause 9. The method of clause 8, wherein the assistance data is sent via one or more of the wireless transceivers.

Clause 10. The method of clause 8, wherein the assistance data is sent to the UE via a wired connection between the UE and the server.

Clause 11. The method of any of clauses 1-10, wherein the signals are transmitted by the UE and received by the at least one wireless transceiver in the wireless network.

Clause 12. The method of any of clauses 1-11, wherein the signals are transmitted by the at least one wireless transceiver in the wireless network and received by the UE.

Clause 13. The method of any of clauses 1-12, wherein the angular measurements comprise at least one of angle of arrival (AOA) measurements, angle of departure (AOD) measurements, or a combination thereof.

Clause 14. The method of any of clauses 1-13, wherein determining the relative position of the UE with respect to the at least one wireless transceiver in the wireless network in the vehicle is further based on round trip time (RTT) ranging between the UE and the at least one wireless transceiver.

Clause 15. The method of any of clauses 1-14, wherein the personal zone is defined in the vehicle based on calibration for vehicle type.

Clause 16. The method of any of clauses 1-15, wherein the personal zone is dynamically adjusted based on a driver seat position.

Clause 17. The method of any of clauses 1-16, further comprising: detecting a change in position or a change in state of the UE; and triggering, for a predetermined period of time in response to detecting the change in position or the change in state of the UE, a determination of the relative position of the UE with respect to the at least one wireless transceiver in the wireless network and a determination if the UE is located in the personal zone in the vehicle.

Clause 18. The method of any of clauses 1-17, further comprising determining an orientation of the UE within the vehicle, wherein restricting the at least one functionality of the UE if the UE is determined to be located in the personal zone in the vehicle is further based on the orientation of the UE.

Clause 19. The method of any of clauses 1-18, wherein restricting the at least one functionality of the UE if the UE is determined to be located in the personal zone in the vehicle comprises at least one of: locking the UE; placing the UE in sleep mode; turning off a display of the UE; disabling touchscreen controls of the UE; pausing an application on the UE; turning off the application on the UE; converting an active call to a speaker mode, or any combination thereof.

Clause 20. The method of any of clauses 1-19, further comprising: enabling driver assistance operations of the vehicle if the UE is determined to be located in the personal zone in the vehicle.

Clause 21. The method of clause 20, wherein enabling driver assistance operations of the vehicle comprises at least one of: sounding a warning; automatically engaging one or more advanced driver-assistance systems (ADAS) comprising at least one of adaptive cruise control, lane departure warning, forward collision warning, traffic signal recognition; and automatically engaging autonomous driving.

Clause 22. A positioning entity in a wireless network in a vehicle configured for relative positioning a user equipment (UE) within the vehicle, comprising:

Clause at least one wireless transceiver configured to communicate with entities in the wireless network; at least one memory; and at least one processor coupled to the at least one wireless transceiver and the at least one memory, wherein the at least one processor is configured to: determine a relative position of the UE with respect to at least one wireless transceiver in the wireless network based at least on angular measurements of signals having a bandwidth of at least 500 MHz, the at least one wireless transceiver having a known position relative to a personal zone that is defined in the vehicle; determine if the UE is located inside the personal zone of a driver of the vehicle based on the relative position of the UE with respect to the at least one wireless transceiver; and determine whether to permit at least one functionality of the UE based on whether the UE is determined to be located in the personal zone of the driver of the vehicle.

Clause 23. The positioning entity of clause 22, wherein the at least one processor is further configured to: restrict at least one functionality of the UE if the UE is determined to be located in the personal zone of the driver of the vehicle; and permit at least one functionality of the UE if the UE is determined to be not located in the personal zone of the driver of the vehicle.

Clause 24. The positioning entity of clause 22, wherein each of the wireless transceivers comprises multiple receive antennas for performing the angular measurements of the signals.

Clause 25. The positioning entity of any of clauses 22-24, wherein each of the wireless transceivers comprises a single receive antenna and the UE comprises multiple receive antennas for performing the angular measurements of the signals.

Clause 26. The positioning entity of any of clauses 22-25, wherein the positioning entity is a server in the wireless network in the vehicle, wherein the at least one processor is configured to restrict the at least one functionality of the UE by being configured to send a message to the UE to restrict the at least one functionality of the UE and wherein the at least one processor is configured to permit the operation of the UE by not sending the message to the UE to restrict the at least one functionality of the UE.

Clause 27. The positioning entity of clause 26, wherein the at least one processor is coupled to the wireless transceivers, and wherein the message to the UE to restrict the at least one functionality of the UE is sent via one or more of the wireless transceivers.

Clause 28. The positioning entity of clause 26, wherein the message to the UE to restrict the at least one functionality of the UE is sent via a wired connection between the UE and the server.

Clause 29. The positioning entity of any of clauses 22-28, wherein the positioning entity is the UE, wherein assistance data is provided to the UE by a server in the wireless network in the vehicle, the assistance data comprising information related to the known positions of the at least one wireless transceiver relative to the personal zone.

Clause 30. The positioning entity of clause 29, wherein the assistance data is received by the UE via one or more of the wireless transceivers.

Clause 31. The positioning entity of clause 29, wherein the assistance data is received by the UE via a wired connection between the UE and the server.

Clause 32. The positioning entity of any of clauses 22-31, wherein the signals are transmitted by the UE and received by the at least one wireless transceiver in the wireless network.

Clause 33. The positioning entity of any of clauses 22-32, wherein the signals are transmitted by the at least one wireless transceiver in the wireless network and received by the UE.

Clause 34. The positioning entity of any of clauses 22-33, wherein the angular measurements comprise at least one of angle of arrival (AOA) measurements, angle of departure (AOD) measurements, or a combination thereof.

Clause 35. The positioning entity of any of clauses 22-34, wherein the at least one processor is configured to determine the relative position of the UE with respect to the at least one wireless transceiver in the wireless network further based on round trip time (RTT) ranging between the UE and the at least one wireless transceiver.

Clause 36. The positioning entity of any of clauses 22-35, wherein the personal zone is defined in the vehicle based on calibration for vehicle type.

Clause 37. The positioning entity of any of clauses 22-35, wherein the personal zone is dynamically adjusted based on a driver seat position.

Clause 38. The positioning entity of any of clauses 22-36, wherein the at least one processor is further configured to: detect a change in position or a change in state of the UE; and trigger, for a predetermined period of time in response to detecting the change in position or the change in state of the UE, a determination of the relative position of the UE with respect to the at least one wireless transceiver in the wireless network in the vehicle and a determination if the UE is located in the personal zone in the vehicle.

Clause 39. The positioning entity of any of clauses 22-37, wherein the at least one processor is further configured to determine an orientation of the UE within the vehicle, wherein the at least one processor is configured to restrict the at least one functionality of the UE if the UE is determined to be located in the personal zone in the vehicle further based on the orientation of the UE.

Clause 40. The positioning entity of any of clauses 22-38, wherein the at least one processor is configured to restrict the at least one functionality of the UE if the UE is determined to be located in the personal zone in the vehicle by being configured to at least one of: lock the UE; place the UE in sleep mode; turn off a display of the UE; disable touchscreen controls of the UE; pause an application on the UE; turn off the application on the UE; convert an active call to a speaker mode, or any combination thereof.

Clause 41. The positioning entity of any of clauses 22-39, wherein the at least one processor is further configured to: enable driver assistance operations of the vehicle if the UE is determined to be located in the personal zone in the vehicle.

Clause 42. The positioning entity of clause 41, wherein the at least one processor is configured to enable driver assistance operations of the vehicle by being configured to at least one of: sound a warning; automatically engage one or more advanced driver-assistance systems (ADAS) comprising at least one of adaptive cruise control, lane departure warning, forward collision warning, traffic signal recognition; and automatically engage autonomous driving.

Clause 43. A positioning entity in a wireless network in a vehicle configured for relative positioning a user equipment (UE) within the vehicle, comprising: means for determining a relative position of the UE with respect to at least one wireless transceiver in the wireless network in the vehicle based at least on angular measurements of signals having a bandwidth of at least 500 MHz, the at least one wireless transceiver having a known position relative to a personal zone that is defined in the vehicle; means for determining if the UE is located inside the personal zone of a driver of the vehicle based on the relative position of the UE with respect to the at least one wireless transceiver; and means for determining whether to permit at least one functionality of the UE based on whether the UE is determined to be located in the personal zone of the driver of the vehicle Clause 44. The positioning entity of clause 43, further comprising: means for restricting at least one functionality of the UE if the UE is determined to be located in the personal zone of the driver of the vehicle; and means for permitting the operation of the UE if the UE is determined to be not located in the personal zone of the driver of the vehicle.

Clause 45. The positioning entity of clause 43, wherein each of the wireless transceivers comprises multiple receive antennas for performing the angular measurements of the signals.

Clause 46. The positioning entity of any of clauses 43-45, wherein each of the wireless transceivers comprises a single receive antenna and the UE comprises multiple receive antennas for performing the angular measurements of the signals.

Clause 47. The positioning entity of any of clauses 43-46, wherein the positioning entity is a server in the wireless network in the vehicle, wherein the means for restricting the at least one functionality of the UE comprises means for sending a message to the UE to restrict the at least one functionality of the UE and wherein the means for permitting the operation of the UE comprises means for not sending the message to the UE to restrict the at least one functionality.

Clause 48. The positioning entity of clause 47, wherein the message to the UE to restrict the at least one functionality of the UE is sent via one or more of the wireless transceivers.

Clause 49. The positioning entity of clause 47, wherein the message to the UE to restrict the at least one functionality of the UE is sent via a wired connection between the UE and the server.

Clause 50. The positioning entity of any of clauses 43-49, wherein the positioning entity is the UE, wherein assistance data is provided to the UE by a server in the wireless network in the vehicle, the assistance data comprising information related to the known positions of the at least one wireless transceiver relative to the personal zone.

Clause 51. The positioning entity of clause 50, wherein the assistance data is sent via one or more of the wireless transceivers.

Clause 52. The positioning entity of clause 50, wherein the assistance data is sent to the UE via a wired connection between the UE and the server.

Clause 53. The positioning entity of any of clauses 43-52, wherein the signals are transmitted by the UE and received by the at least one wireless transceiver in the wireless network in the vehicle.

Clause 54. The positioning entity of any of clauses 43-53, wherein the signals are transmitted by the at least one wireless transceiver in the wireless network in the vehicle and received by the UE.

Clause 55. The positioning entity of any of clauses 43-54, wherein the angular measurements comprise at least one of angle of arrival (AOA) measurements, angle of departure (AOD) measurements, or a combination thereof.

Clause 56. The positioning entity of any of clauses 43-55, wherein the means for determining the relative position of the UE with respect to the at least one wireless transceiver in the wireless network in the vehicle determines the relative position of the UE further based on round trip time (RTT) ranging between the UE and the at least one wireless transceiver.

Clause 57. The positioning entity of any of clauses 43-56, wherein the personal zone is defined in the vehicle based on calibration for vehicle type.

Clause 58. The positioning entity of any of clauses 43-57, wherein the personal zone is dynamically adjusted based on a driver seat position.

Clause 59. The positioning entity of any of clauses 43-58, further comprising: means for detecting a change in position or a change in state of the UE; and means for triggering, for a predetermined period of time in response to detecting the change in position or the change in state of the UE, a determination of the relative position of the UE with respect to the at least one wireless transceiver in the wireless network in the vehicle and a determination if the UE is located in the personal zone in the vehicle.

Clause 60. The positioning entity of any of clauses 43-59, further comprising means for determining an orientation of the UE within the vehicle, wherein the means for restricting the at least one functionality of the UE if the UE is determined to be located in the personal zone in the vehicle restricts the at least one functionality further based on the orientation of the UE.

Clause 61. The positioning entity of any of clauses 43-60, wherein the means for restricting the at least one functionality of the UE if the UE is determined to be located in the personal zone in the vehicle performs at least one of: locking the UE; placing the UE in sleep mode; turning off a display of the UE; disabling touchscreen controls of the UE; pausing an application on the UE; turning off the application on the UE; converting an active call to a speaker mode, or any combination thereof.

Clause 62. The positioning entity of any of clauses 43-61, further comprising: means for enabling driver assistance operations of the vehicle if the UE is determined to be located in the personal zone in the vehicle.

Clause 63. The positioning entity of clause 62, wherein the means for enabling driver assistance operations of the vehicle performs at least one of: sounding a warning; automatically engaging one or more advanced driver-assistance systems (ADAS) comprising at least one of adaptive cruise control, lane departure warning, forward collision warning, traffic signal recognition; and automatically engaging autonomous driving.

Clause 64. A non-transitory storage medium including program code stored thereon, the program code is operable to configure at least one processor in a positioning entity in a wireless network in a vehicle for relative positioning a user equipment (UE) within the vehicle, the program code comprising instructions to: determine a relative position of the UE with respect to at least one wireless transceiver in the wireless network in the vehicle based at least on angular measurements of signals having a bandwidth of at least 500 MHz, the at least one wireless transceiver having a known position relative to a personal zone that is defined in the vehicle; determine if the UE is located inside the personal zone of a driver of the vehicle based on the relative position of the UE with respect to the at least one wireless transceiver; and determine whether to permit at least one functionality of the UE based on whether the UE is determined to be located in the personal zone of the driver of the vehicle.

Clause 65. The non-transitory storage medium of clause 64, wherein the program code further comprises instructions to: restrict at least one functionality of the UE if the UE is determined to be located in the personal zone of the driver of the vehicle; and permit the operation of the UE if the UE is determined to be not located in the personal zone of the driver of the vehicle.

Clause 66. The non-transitory storage medium of clause 64, wherein each of the wireless transceivers comprises multiple receive antennas for performing the angular measurements of the signals.

Clause 67. The non-transitory storage medium of any of clauses 64-66, wherein each of the wireless transceivers comprises a single receive antenna and the UE comprises multiple receive antennas for performing the angular measurements of the signals.

Clause 68. The non-transitory storage medium of any of clauses 64-67, wherein the positioning entity is a server in the wireless network in the vehicle, wherein the instructions to restrict the at least one functionality of the UE comprise instructions to send a message to the UE to restrict the at least one functionality of the UE and wherein the instructions to permit the operation of the UE comprise instructions to not send the message to the UE to restrict the at least one functionality.

Clause 69. The non-transitory storage medium of clause 68, wherein the message to the UE to restrict the at least one functionality of the UE is sent via one or more of the wireless transceivers.

Clause 70. The non-transitory storage medium of clause 68, wherein the message to the UE to restrict the at least one functionality of the UE is sent via a wired connection between the UE and the server.

Clause 71. The non-transitory storage medium of any of clauses 64-70, wherein the positioning entity is the UE, wherein assistance data is provided to the UE by a server in the wireless network in the vehicle, the assistance data comprising information related to the known positions of the at least one wireless transceiver relative to the personal zone.

Clause 72. The non-transitory storage medium of clause 71, wherein the assistance data is received by the UE via one or more of the wireless transceivers.

Clause 73. The non-transitory storage medium of clause 71, wherein the assistance data is received by the UE via a wired connection between the UE and the server.

Clause 74. The non-transitory storage medium of any of clauses 64-73, wherein the signals are transmitted by the UE and received by the at least one wireless transceiver in the wireless network in the vehicle.

Clause 75. The non-transitory storage medium of any of clauses 64-74, wherein the signals are transmitted by the at least one wireless transceiver in the wireless network in the vehicle and received by the UE.

Clause 76. The non-transitory storage medium of any of clauses 64-75, wherein the angular measurements comprise at least one of angle of arrival (AOA) measurements, angle of departure (AOD) measurements, or a combination thereof.

Clause 77. The non-transitory storage medium of any of clauses 64-76, wherein the instructions to determine the relative position of the UE with respect to the at least one wireless transceiver in the wireless network in the vehicle includes instructions to determine the relative position further based on round trip time (RTT) ranging between the UE and the at least one wireless transceiver.

Clause 78. The non-transitory storage medium of any of clauses 64-77, wherein the personal zone is defined in the vehicle based on calibration for vehicle type.

Clause 79. The non-transitory storage medium of any of clauses 64-78, wherein the personal zone is dynamically adjusted based on a driver seat position.

Clause 80. The non-transitory storage medium of any of clauses 64-79, wherein the program code further comprises instructions to: detect a change in position or a change in state of the UE; and trigger, for a predetermined period of time in response to detecting the change in position or the change in state of the UE, a determination of the relative position of the UE with respect to the at least one wireless transceiver in the wireless network in the vehicle and a determination if the UE is located in the personal zone in the vehicle.

Clause 81. The non-transitory storage medium of any of clauses 64-80, wherein the program code further comprises instructions to determine an orientation of the UE within the vehicle, wherein the instructions to restrict the at least one functionality of the UE if the UE is determined to be located in the personal zone in the vehicle restricts the at least one functionality further based on the orientation of the UE.

Clause 82. The non-transitory storage medium of any of clauses 64-81, wherein the instructions to restrict the at least one functionality of the UE if the UE is determined to be located in the personal zone in the vehicle comprises instructions to perform at least one of: lock the UE; place the UE in sleep mode; turn off a display of the UE; disable touchscreen controls of the UE; pause an application on the UE; turn off the application on the UE; convert an active call to a speaker mode, or any combination thereof.

Clause 83. The non-transitory storage medium of any of clauses 64-82, wherein the program code further comprises instructions to: enable driver assistance operations of the vehicle if the UE is determined to be located in the personal zone in the vehicle.

Clause 84. The non-transitory storage medium of clause 83, wherein the instructions to enable driver assistance operations of the vehicle comprises instructions to perform at least one of: sound a warning; automatically engage one or more advanced driver-assistance systems (ADAS) comprising at least one of adaptive cruise control, lane departure warning, forward collision warning, traffic signal recognition; and automatically engage autonomous driving.

Clause 85. A method performed by a positioning entity in a wireless network in a vehicle for relative positioning a user equipment (UE) worn by a driver of the vehicle, the method comprising: determining a relative position of the UE worn by the driver of the vehicle with respect to one or more wireless transceivers in the wireless network based at least on round trip time (RTT) ranging or angular measurements of signals having a bandwidth of at least 500 MHz, the one or more wireless transceivers having a known position relative to a steering wheel in the vehicle; determining if the UE worn by the driver is located within a threshold distance to the steering wheel based on the relative position of the UE with respect to the one or more wireless transceivers and the known position of the one or more wireless transceivers relative to the steering wheel; and determining whether to restrict autonomous operation of the vehicle if the UE is determined to be outside the threshold distance to the steering wheel.

Clause 86. The method of clause 85, further comprising: restricting autonomous operation of the vehicle if the UE is determined to be outside the threshold distance to the steering wheel; and permitting autonomous operation of the vehicle if the UE is determined to be within the threshold distance to the steering wheel.

Clause 87. The method of clause 85, wherein the UE is worn on a wrist of the driver and the threshold distance to the steering wheel provides an indication that a hand of the driver is on the steering wheel.

Clause 88. The method of any of clauses 85-87, wherein the autonomous operation of the vehicle comprises at least one of one or more advanced driver-assistance systems (ADAS) comprising adaptive cruise control, lane departure warning, forward collision warning, traffic signal recognition and autonomous driving.

Clause 89. The method of any of clauses 85-88, wherein the positioning entity is a server in the wireless network in the vehicle.

Clause 90. The method of any of clauses 85-89, wherein the positioning entity is the UE worn by the driver, wherein restricting the autonomous operation of the vehicle comprises sending a message to a server in the wireless network in the vehicle to restrict the autonomous operation of the vehicle and wherein permitting the autonomous operation of the vehicle comprises not sending the message to the vehicle to restrict the autonomous operation.

Clause 91. The method of clause 90, wherein the message to the server is sent by the UE to the server via one or more of the wireless transceivers.

Clause 92. The method of clause 90, wherein the message to the server is sent with a wired connection between the UE and the server.

Clause 93. The method of any of clauses 85-92, wherein the angular measurements comprise at least one of angle of arrival (AOA) measurements, angle of departure (AOD) measurements, or a combination thereof.

Clause 94. The method of any of clauses 85-93, wherein the signals are transmitted by the UE and received by the one or more wireless transceivers in the wireless network in the vehicle.

Clause 95. The method of any of clauses 85-94, wherein the signals are transmitted by the one or more wireless transceivers in the wireless network in the vehicle and received by the UE.

Clause 96. The method of any of clauses 85-95, wherein at least one of the one or more wireless transceivers is mounted on the steering wheel.

Clause 97. A positioning entity in a wireless network in a vehicle configured for relative positioning a user equipment (UE) worn by a driver of the vehicle, comprising:

Clause at least one wireless transceiver configured to communicate with entities in the wireless network; at least one memory; and at least one processor coupled to the at least one wireless transceiver and the at least one memory, wherein the at least one processor is configured to: determine a relative position of the UE worn by the driver of the vehicle with respect to one or more wireless transceivers in the wireless network based at least on round trip time (RTT) ranging or angular measurements of signals having a bandwidth of at least 500 MHz, the one or more wireless transceivers having a known position relative to a steering wheel in the vehicle; determine if the UE worn by the driver is located within a threshold distance to the steering wheel based on the relative position of the UE with respect to the one or more wireless transceivers and the known position of the one or more wireless transceivers relative to the steering wheel; and determine whether to restrict autonomous operation of the vehicle if the UE is determined to be outside the threshold distance to the steering wheel.

Clause 98. The positioning entity of clause 97, wherein the at least one processor is further configured to: restrict autonomous operation of the vehicle if the UE is determined to be outside the threshold distance to the steering wheel; and permit autonomous operation of the vehicle if the UE is determined to be within the threshold distance to the steering wheel.

Clause 99. The positioning entity of clause 97, wherein the UE is worn on a wrist of the driver and the threshold distance to the steering wheel provides an indication that a hand of the driver is on the steering wheel.

Clause 100. The positioning entity of any of clauses 97-99, wherein the autonomous operation of the vehicle comprises at least one of one or more advanced driver-assistance systems (ADAS) comprising adaptive cruise control, lane departure warning, forward collision warning, traffic signal recognition and autonomous driving.

Clause 101. The positioning entity of any of clauses 97-100, wherein the positioning entity is a server in the wireless network in the vehicle.

Clause 102. The positioning entity of any of clauses 97-101, wherein the positioning entity is the UE worn by the driver, wherein the at least one processor is configured to restrict the autonomous operation of the vehicle by being configured to send a message to a server in the wireless network in the vehicle to restrict the autonomous operation of the vehicle and wherein the at least one processor is configured to permit the autonomous operation of the vehicle by being configured to not send the message to the vehicle to restrict the autonomous operation.

Clause 103. The positioning entity of clause 102, wherein the message to the server is sent by the UE to the server via one or more of the wireless transceivers.

Clause 104. The positioning entity of clause 102, wherein the message to the server is sent with a wired connection between the UE and the server.

Clause 105. The positioning entity of any of clauses 97-104, wherein the angular measurements comprise at least one of angle of arrival (AOA) measurements, angle of departure (AOD) measurements, or a combination thereof.

Clause 106. The positioning entity of any of clauses 97-105, wherein the signals are transmitted by the UE and received by the one or more wireless transceivers in the wireless network in the vehicle.

Clause 107. The positioning entity of any of clauses 97-106, wherein the signals are transmitted by the one or more wireless transceivers in the wireless network in the vehicle and received by the UE.

Clause 108. The positioning entity of any of clauses 97-107, wherein at least one of the one or more wireless transceivers is mounted on the steering wheel.

Clause 109. A positioning entity in a wireless network in a vehicle configured for relative positioning a user equipment (UE) worn by a driver of the vehicle, comprising: means for determining a relative position of the UE worn by the driver of the vehicle with respect to one or more wireless transceivers in the wireless network in the vehicle based at least on round trip time (RTT) ranging or angular measurements of signals having a bandwidth of at least 500 MHz, the one or more wireless transceivers having a known position relative to a steering wheel in the vehicle; means for determining if the UE worn by the driver is located within a threshold distance to the steering wheel based on the relative position of the UE with respect to the one or more wireless transceivers and the known position of the one or more wireless transceivers relative to the steering wheel; and means for determining whether to restrict autonomous operation of the vehicle if the UE is determined to be outside the threshold distance to the steering wheel.

Clause 110. The positioning entity of clause 109, further comprising: means for restricting autonomous operation of the vehicle if the UE is determined to be outside the threshold distance to the steering wheel; and means for permitting autonomous operation of the vehicle if the UE is determined to be within the threshold distance to the steering wheel.

Clause 111. The positioning entity of clause 109, wherein the UE is worn on a wrist of the driver and the threshold distance to the steering wheel provides an indication that a hand of the driver is on the steering wheel.

Clause 112. The positioning entity of any of clauses 109-111, wherein the autonomous operation of the vehicle comprises at least one of one or more advanced driver-assistance systems (ADAS) comprising adaptive cruise control, lane departure warning, forward collision warning, traffic signal recognition and autonomous driving.

Clause 113. The positioning entity of any of clauses 109-112, wherein the positioning entity is a server in the wireless network in the vehicle.

Clause 114. The positioning entity of any of clauses 109-113, wherein the positioning entity is the UE worn by the driver, wherein the means for restricting the autonomous operation of the vehicle comprises means for sending a message to a server in the wireless network in the vehicle to restrict the autonomous operation of the vehicle and wherein the means for permitting the autonomous operation of the vehicle comprises means for not sending the message to the vehicle to restrict the autonomous operation.

Clause 115. The positioning entity of clause 114, wherein the message to the server is sent by the UE to the server via one or more of the wireless transceivers.

Clause 116. The positioning entity of clause 114, wherein the message to the server is sent with a wired connection between the UE and the server.

Clause 117. The positioning entity of any of clauses 109-116, wherein the angular measurements comprise at least one of angle of arrival (AOA) measurements, angle of departure (AOD) measurements, or a combination thereof.

Clause 118. The positioning entity of any of clauses 109-117, wherein the signals are transmitted by the UE and received by the one or more wireless transceivers in the wireless network in the vehicle.

Clause 119. The positioning entity of any of clauses 109-118, wherein the signals are transmitted by the one or more wireless transceivers in the wireless network in the vehicle and received by the UE.

Clause 120. The positioning entity of any of clauses 109-119, wherein at least one of the one or more wireless transceivers is mounted on the steering wheel.

Clause 121. A non-transitory storage medium including program code stored thereon, the program code is operable to configure at least one processor in a positioning entity in a wireless network in a vehicle for relative positioning a user equipment (UE) worn by a driver of the vehicle, the program code comprising instructions to: determine a relative position of the UE worn by the driver of the vehicle with respect to one or more wireless transceivers in the wireless network in the vehicle based at least on round trip time (RTT) ranging or angular measurements of signals having a bandwidth of at least 500 MHz, the one or more wireless transceivers having a known position relative to a steering wheel in the vehicle; determine if the UE worn by the driver is located within a threshold distance to the steering wheel based on the relative position of the UE with respect to the one or more wireless transceivers and the known position of the one or more wireless transceivers relative to the steering wheel; and determine whether to restrict autonomous operation of the vehicle if the UE is determined to be outside the threshold distance to the steering wheel.

Clause 122. The non-transitory storage medium of clause 121, wherein the program code further comprises instructions to: restrict autonomous operation of the vehicle if the UE is determined to be outside the threshold distance to the steering wheel; and permit autonomous operation of the vehicle if the UE is determined to be within the threshold distance to the steering wheel.

Clause 123. The non-transitory storage medium of clause 121, wherein the UE is worn on a wrist of the driver and the threshold distance to the steering wheel provides an indication that a hand of the driver is on the steering wheel.

Clause 124. The non-transitory storage medium of any of clauses 121-123, wherein the autonomous operation of the vehicle comprises at least one of one or more advanced driver-assistance systems (ADAS) comprising adaptive cruise control, lane departure warning, forward collision warning, traffic signal recognition and autonomous driving.

Clause 125. The non-transitory storage medium of any of clauses 121-124, wherein the positioning entity is a server in the wireless network in the vehicle.

Clause 126. The non-transitory storage medium of any of clauses 121-125, wherein the positioning entity is the UE worn by the driver, wherein the instructions to restrict the autonomous operation of the vehicle comprises instructions to send a message to a server in the wireless network in the vehicle to restrict the autonomous operation of the vehicle and wherein the instructions to permit the autonomous operation of the vehicle comprises instructions to not send the message to the vehicle to restrict the autonomous operation.

Clause 127. The non-transitory storage medium of clause 126, wherein the message to the server is sent by the UE to the server via one or more of the wireless transceivers.

Clause 128. The non-transitory storage medium of clause 126, wherein the message to the server is sent with a wired connection between the UE and the server.

Clause 129. The non-transitory storage medium of any of clauses 121-128, wherein the angular measurements comprise at least one of angle of arrival (AOA) measurements, angle of departure (AOD) measurements, or a combination thereof.

Clause 130. The non-transitory storage medium of any of clauses 121-129, wherein the signals are transmitted by the UE and received by the one or more wireless transceivers in the wireless network in the vehicle.

Clause 131. The non-transitory storage medium of any of clauses 121-130, wherein the signals are transmitted by the one or more wireless transceivers in the wireless network in the vehicle and received by the UE.

Clause 132. The non-transitory storage medium of any of clauses 121-132, wherein at least one of the one or more wireless transceivers is mounted on the steering wheel.

Therefore, it is intended that claimed subject matter not be limited to the particular examples disclosed, but that such claimed subject matter may also include all aspects falling within the scope of appended claims, and equivalents thereof.

What is claimed is:

1. A method performed by a positioning entity in a wireless network in a vehicle for relative positioning a user equipment (UE) within the vehicle, the method comprising:
    obtaining angular measurements of signals having a bandwidth of at least 500 MHZ, wherein the signals are transmitted between the UE and at least one wireless transceiver in the wireless network, the signals being transmitted based on a trigger message from the UE, and wherein the trigger message indicates that the UE has detected a change in position, orientation, or state of the UE;
    determining a relative position of the UE with respect to the at least one wireless transceiver in the wireless network using the angular measurements, the at least one wireless transceiver in the wireless network having a known position relative to a personal zone that is defined in the vehicle, wherein the personal zone is one of a plurality of zones defined within a cabin of the vehicle, the personal zone corresponding to an area around a driver seat;
    determining if the UE is located inside the personal zone based on the relative position of the UE with respect to the at least one wireless transceiver; and
    determining whether to permit at least one functionality of the UE based on whether the UE is determined to be located in the personal zone.

2. The method of claim 1, further comprising:
    restricting at least one functionality of the UE if the UE is determined to be located in the personal zone; and
    permitting operation of the UE if the UE is determined to be not located in the personal zone.

3. The method of claim 1, wherein each wireless transceiver of the at least one wireless transceiver in the wireless network comprises multiple receive antennas for performing the angular measurements of the signals.

4. The method of claim 1, wherein each wireless transceiver of the at least one wireless transceiver in the wireless network comprises a single receive antenna and the UE comprises multiple receive antennas for performing the angular measurements of the signals.

5. The method of claim 2, wherein the positioning entity is a server in the wireless network in the vehicle, wherein restricting the at least one functionality of the UE comprises sending a message to the UE to restrict the at least one functionality of the UE and wherein permitting the operation of the UE comprises not sending the message to the UE to restrict the at least one functionality.

6. The method of claim 1, wherein the positioning entity is the UE, wherein assistance data is provided to the UE by a server in the wireless network in the vehicle, the assistance data comprising information related to the known position of the at least one wireless transceiver relative to the personal zone.

7. The method of claim 1, wherein the signals are transmitted by the UE and received by the at least one wireless transceiver in the wireless network.

8. The method of claim 1, wherein the signals are transmitted by the at least one wireless transceiver in the wireless network and received by the UE.

9. The method of claim 1, wherein the angular measurements comprise at least one of angle of arrival (AOA) measurements, angle of departure (AOD) measurements, or a combination thereof.

10. The method of claim 1, wherein determining the relative position of the UE with respect to the at least one wireless transceiver in the wireless network is further based on round trip time (RTT) ranging between the UE and the at least one wireless transceiver in the wireless network.

11. The method of claim 1, wherein the personal zone is defined in the vehicle based on calibration for vehicle type.

12. The method of claim 1, further comprising:
    prior to determining the relative position of the UE with respect to the at least one wireless transceiver in the wireless network, obtaining an updated definition of the personal zone based on a change in a position of the driver seat.

13. The method of claim 1, wherein:
    the change in position, orientation or state of the UE corresponds to a transition from the UE being (a) stationary, locked, turned off, or in a state where the UE is inoperable by a user to the UE being (b) in motion, unlocked, turned on, or in a state where the UE is operable by a user; and
    the method further comprises repeating the determination of the relative position of the UE with respect to the at least one wireless transceiver in the wireless network and the determination if the UE is located in the personal zone, for a certain period of time after the UE transitions back to being (a) stationary, locked, turned off, or in a state where the UE is inoperable by a user.

14. The method of claim 1, further comprising determining an orientation of the UE within the vehicle, wherein restricting the at least one functionality of the UE if the UE is determined to be located in the personal zone in the vehicle is further based on the orientation of the UE.

15. The method of claim 1, wherein restricting the at least one functionality of the UE if the UE is determined to be located in the personal zone in the vehicle comprises at least one of:
    locking the UE;
    placing the UE in sleep mode;
    turning off a display of the UE;
    disabling touchscreen controls of the UE;
    pausing an application on the UE;
    turning off the application on the UE;

converting an active call to a speaker mode; or any combination thereof.

16. The method of claim 1, further comprising:
enabling driver assistance operations of the vehicle if the UE is determined to be located in the personal zone in the vehicle.

17. A positioning entity in a wireless network in a vehicle configured for relative positioning a user equipment (UE) within the vehicle, comprising:
one or more wireless transceivers configured to communicate with entities in the wireless network;
at least one memory; and
at least one processor coupled to the one or more wireless transceivers and the at least one memory, wherein the at least one processor is configured to:
obtain angular measurements of signals having a bandwidth of at least 500 MHz, wherein the signals are transmitted between the UE and at least one wireless transceiver in the wireless network, the signals being transmitted based on a trigger message from the UE, and wherein the trigger message indicates that the UE has detected a change in position, orientation, or state of the UE;
determine a relative position of the UE with respect to the at least one wireless transceiver in the wireless network using the angular measurements, the at least one wireless transceiver in the wireless network having a known position relative to a personal zone that is defined in the vehicle, wherein the personal zone is one of a plurality of zones defined within a cabin of the vehicle, the personal zone corresponding to an area around a driver seat;
determine if the UE is located inside the personal zone based on the relative position of the UE with respect to the at least one wireless transceiver in the wireless network; and
determine whether to permit at least one functionality of the UE based on whether the UE is determined to be located in the personal zone.

18. The positioning entity of claim 17, wherein the at least one processor is further configured to:
restrict at least one functionality of the UE if the UE is determined to be located in the personal zone; and
permit operation of the UE if the UE is determined to be not located in the personal zone.

19. The positioning entity of claim 17, wherein each wireless transceiver of the at least one wireless transceiver in the wireless network comprises multiple receive antennas for performing the angular measurements of the signals.

20. The positioning entity of claim 17, wherein each wireless transceiver of the at least one wireless transceiver in the wireless network comprises a single receive antenna and the UE comprises multiple receive antennas for performing the angular measurements of the signals.

21. The positioning entity of claim 18, wherein the positioning entity is a server in the wireless network in the vehicle, wherein the at least one processor is configured to restrict the at least one functionality of the UE by being configured to send a message to the UE to restrict the at least one functionality of the UE and wherein the at least one processor is configured to permit the operation of the UE by not sending the message to the UE to restrict the at least one functionality of the UE.

22. The positioning entity of claim 17, wherein the positioning entity is the UE, wherein assistance data is provided to the UE by a server in the wireless network in the vehicle, the assistance data comprising information related to the known position of the at least one wireless transceiver relative to the personal zone.

23. The positioning entity of claim 17, wherein the signals are transmitted by the UE and received by the at least one wireless transceiver in the wireless network.

24. The positioning entity of claim 17, wherein the signals are transmitted by the at least one wireless transceiver in the wireless network and received by the UE.

25. The positioning entity of claim 17, wherein the angular measurements comprise at least one of angle of arrival (AOA) measurements, angle of departure (AOD) measurements, or a combination thereof.

26. The positioning entity of claim 17, wherein the at least one processor is configured to determine the relative position of the UE with respect to the at least one wireless transceiver in the wireless network further based on round trip time (RTT) ranging between the UE and the at least one wireless transceiver in the wireless network.

27. The positioning entity of claim 17, wherein the personal zone is defined in the vehicle based on calibration for vehicle type.

28. The positioning entity of claim 17, wherein the positioning entity is configured to, prior to determining the relative position of the UE with respect to the at least one wireless transceiver in the wireless network, obtain an updated definition of the personal zone based on a change in a position of the driver seat.

29. The positioning entity of claim 17, wherein:
the change in position, orientation or state of the UE corresponds to a transition from the UE being (a) stationary, locked, turned off, or in a state where the UE is inoperable by a user to the UE being (b) in motion, unlocked, turned on, or in a state where the UE is operable by a user; and
the at least one processor is further configured to repeat the determination of the relative position of the UE with respect to the at least one wireless transceiver in the wireless network and the determination if the UE is located in the personal zone, for a certain period of time after the UE transitions back to being (a) stationary, locked, turned off, or in a state where the UE is inoperable by a user.

30. The positioning entity of claim 17, wherein the at least one processor is further configured to determine an orientation of the UE within the vehicle, wherein the at least one processor is configured to restrict the at least one functionality of the UE if the UE is determined to be located in the personal zone in the vehicle further based on the orientation of the UE.

31. The positioning entity of claim 17, wherein the at least one processor is configured to restrict the at least one functionality of the UE if the UE is determined to be located in the personal zone in the vehicle by being configured to at least one of:
lock the UE;
place the UE in sleep mode;
turn off a display of the UE;
disable touchscreen controls of the UE;
pause an application on the UE;
turn off the application on the UE;
convert an active call to a speaker mode; or
any combination thereof.

32. The positioning entity of claim 17, wherein the at least one processor is further configured to:

enable driver assistance operations of the vehicle if the UE is determined to be located in the personal zone in the vehicle.

\* \* \* \* \*